(12) United States Patent
Shade et al.

(10) Patent No.: US 12,457,247 B1
(45) Date of Patent: Oct. 28, 2025

(54) AUTOMATED DEVICE AND ACCOUNT SECURITY SETTING UPDATE INITIATION

(71) Applicant: Curinos, Inc., New York, NY (US)

(72) Inventors: Andrew Thomas Shade, San Diego, CA (US); Kyle David Estlick, Seattle, WA (US); Sidney Hong, New York, NY (US); Luca Giacinto Cazzanti, Seattle, WA (US); Oliver Bruce Downs, Woodinville, WA (US)

(73) Assignee: Curinos, Inc., New York, NY (US)

( * ) Notice: Subject to any disclaimer, the term of this patent is extended or adjusted under 35 U.S.C. 154(b) by 65 days.

(21) Appl. No.: 18/649,254

(22) Filed: Apr. 29, 2024

(51) Int. Cl.
*H04L 9/40* (2022.01)

(52) U.S. Cl.
CPC .......... *H04L 63/20* (2013.01); *H04L 63/1483* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 7,813,951 | B2 | 10/2010 | Eskandari |
| 7,813,952 | B2 | 10/2010 | Eskandari |
| 8,644,468 | B2 | 2/2014 | Dantressangle et al. |
| 8,790,168 | B1 | 7/2014 | Wolters et al. |
| 8,843,431 | B2 | 9/2014 | Anderson et al. |
| 2005/0234763 | A1 | 10/2005 | Pinto et al. |
| 2007/0156673 | A1 | 7/2007 | Maga et al. |
| 2007/0185867 | A1 | 8/2007 | Maga et al. |
| 2011/0218955 | A1 | 9/2011 | Tang et al. |
| 2011/0295649 | A1 | 12/2011 | Fine et al. |
| 2012/0053990 | A1 | 3/2012 | Pereg et al. |
| 2012/0078814 | A1 | 3/2012 | Clark et al. |
| 2013/0124258 | A1 | 5/2013 | Jamal et al. |
| 2013/0124448 | A1* | 5/2013 | Soulie-Fogelman .. G06Q 50/01 706/52 |
| 2013/0204682 | A1 | 8/2013 | Stachiw |
| 2014/0278779 | A1 | 9/2014 | Maga et al. |
| 2015/0229664 | A1* | 8/2015 | Hawthorn ........... H04L 63/1433 726/25 |
| 2015/0269609 | A1 | 9/2015 | Mehanian et al. |
| 2015/0371163 | A1 | 12/2015 | Noh et al. |

(Continued)

*Primary Examiner* — Hieu T Hoang
(74) *Attorney, Agent, or Firm* — VLP Law Group LLP; James A. D. White

(57) ABSTRACT

Techniques are described for automatically updating settings of computing devices and/or accounts, such as to improve security to prevent unauthorized intrusions. Effectiveness of particular configuration settings may be analyzed after attempted intrusions and/or messages sent to associated users to prompt performance of unauthorized actions. Configuration settings to automatically apply and/or messages to be sent may be selected using reinforcement learning with a selection policy based on multi-armed bandit techniques with Thompson Sampling to learn and exploit the most effective messages, and decision tree(s) may be generated whose leaf nodes each represents a learned segment with a group of computing devices and/or users who share common attributes, and describe a value function for the reinforcement learning. One or more trained large language models (LLMs) may also be used to further generate new messages by modifying aspects of existing messages, such as for the most effective identified messages.

27 Claims, 11 Drawing Sheets

(56) References Cited

U.S. PATENT DOCUMENTS

| | | | |
|---|---|---|---|
| 2017/0244746 A1* | 8/2017 | Hawthorn | G06F 21/55 |
| 2018/0295152 A1* | 10/2018 | Kras | H04L 63/1433 |
| 2019/0173918 A1* | 6/2019 | Sites | G06N 3/044 |
| 2020/0177612 A1* | 6/2020 | Kras | G06N 20/00 |
| 2021/0365866 A1* | 11/2021 | Kras | G06F 21/552 |
| 2021/0407308 A1* | 12/2021 | Brubaker | H04L 63/1433 |
| 2022/0030029 A1* | 1/2022 | Kagan | G06F 21/44 |
| 2022/0345485 A1* | 10/2022 | Kras | H04L 51/08 |
| 2022/0377101 A1* | 11/2022 | Kras | H04L 63/1483 |

\* cited by examiner

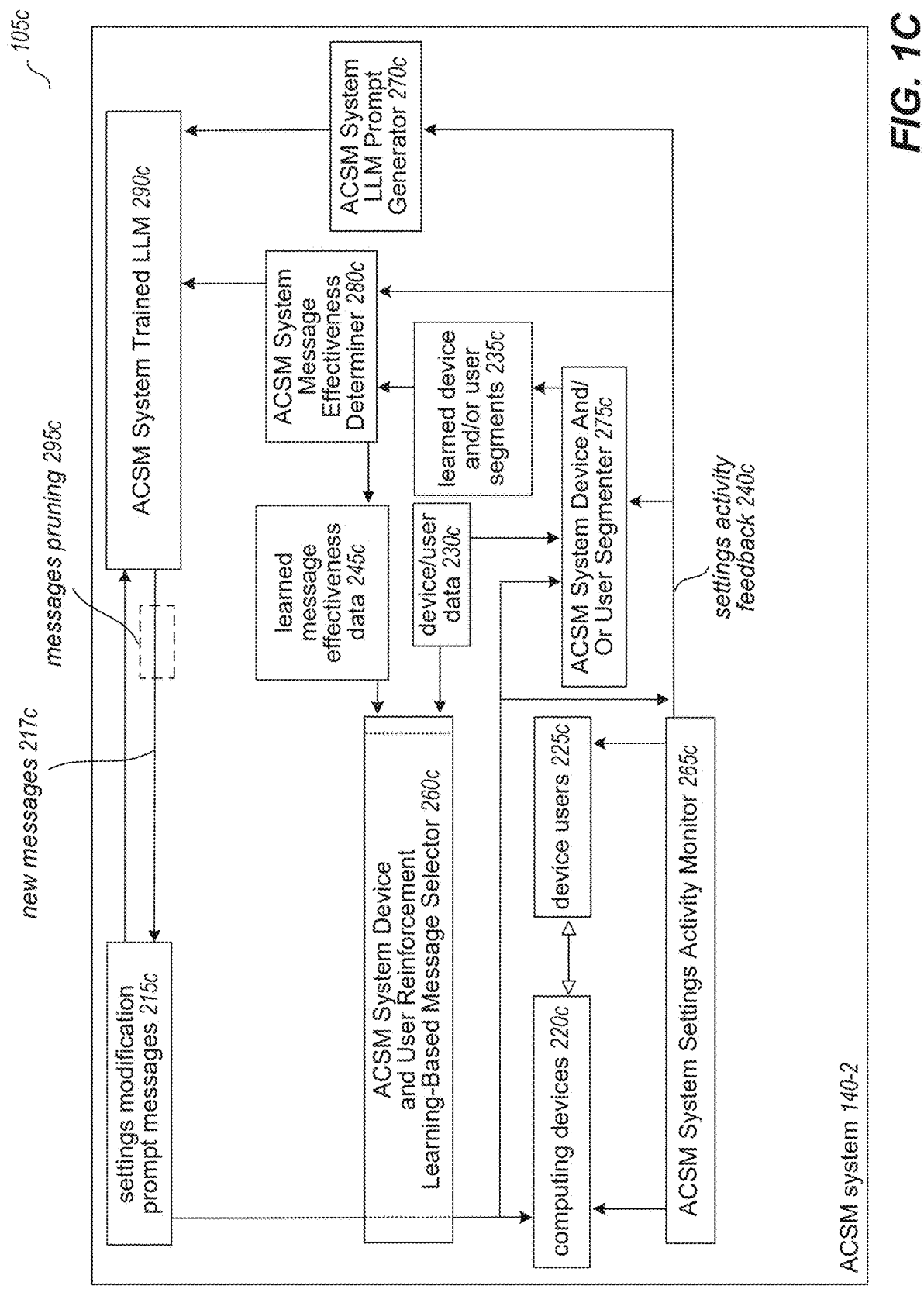

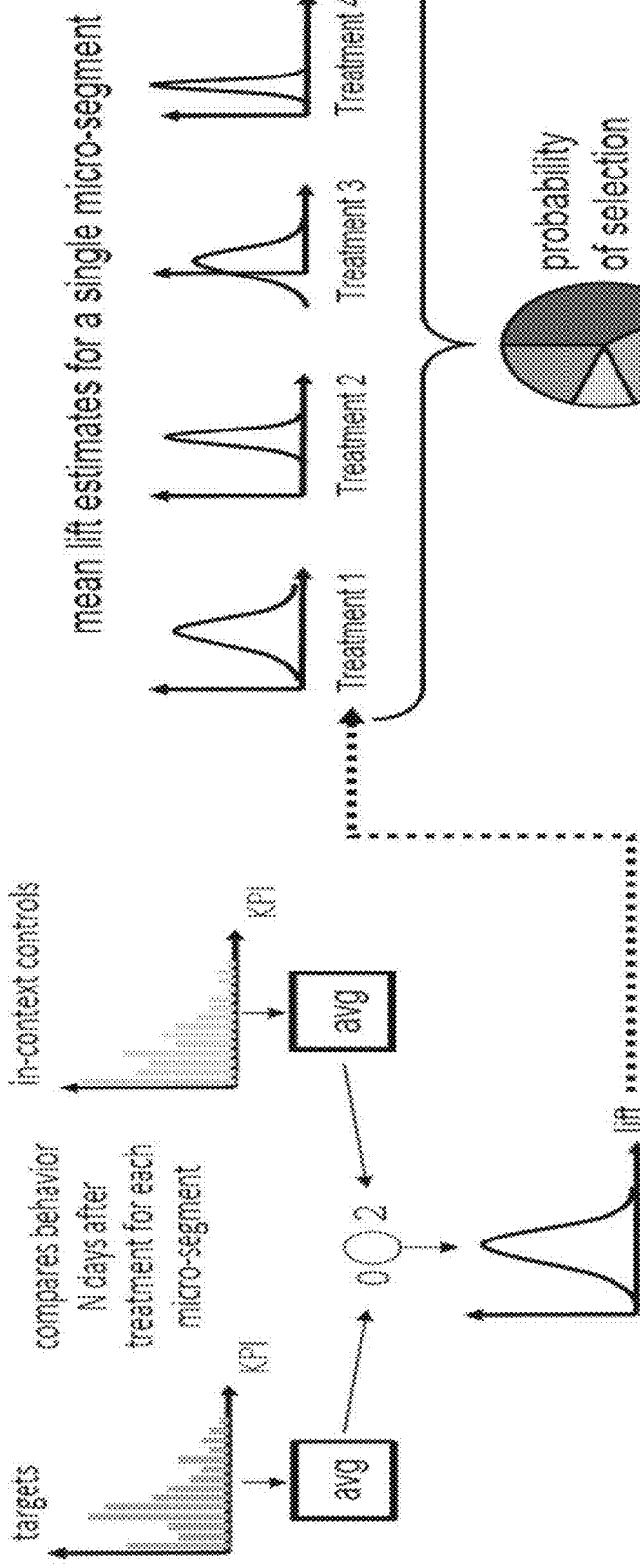

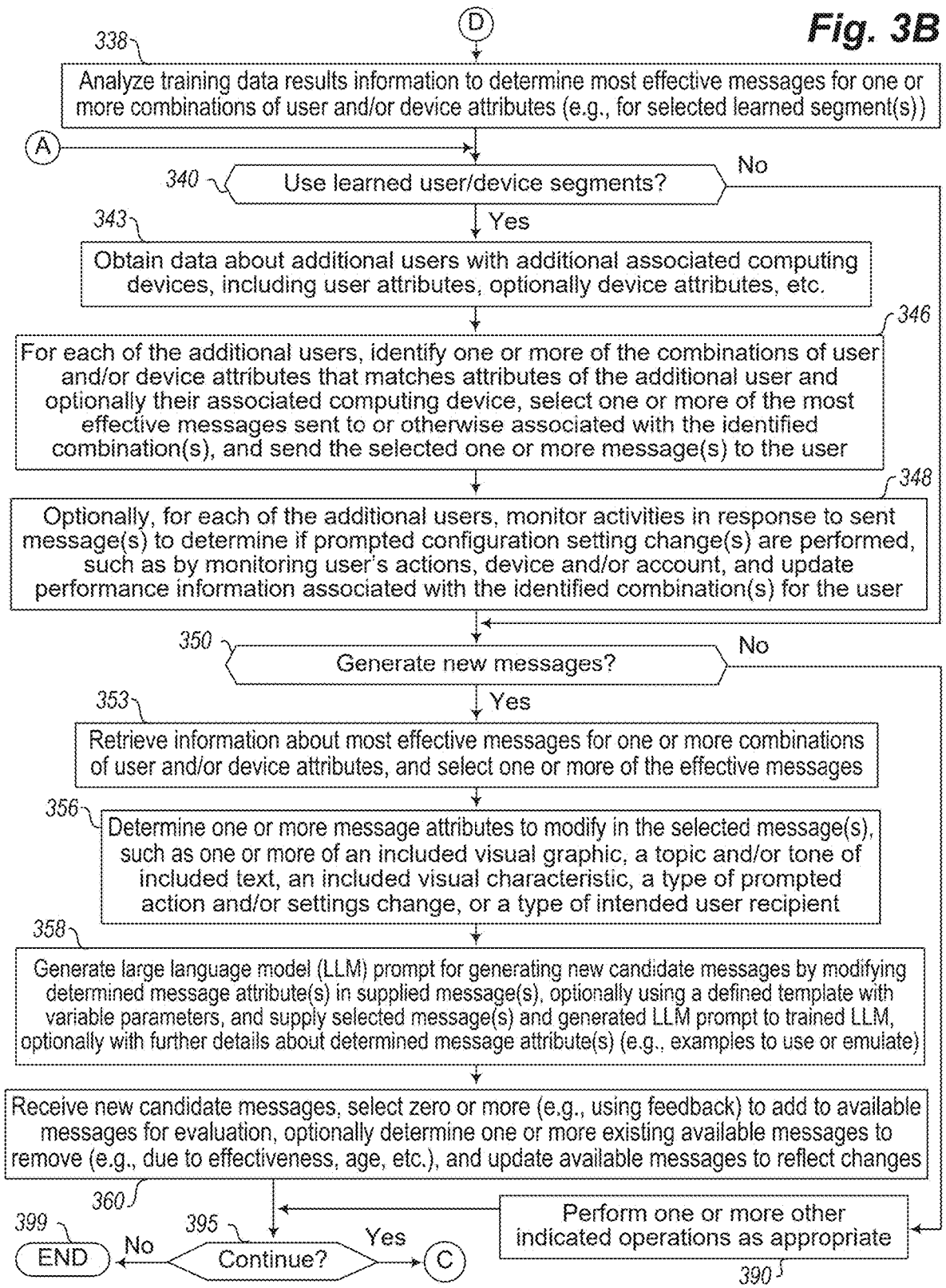

AUTOMATED DEVICE AND ACCOUNT SECURITY SETTING UPDATE INITIATION

TECHNICAL FIELD

The following disclosure relates generally to performing automated operations to cause updates in settings of devices and accounts, such as to use reinforcement learning to select security configuration settings updates to automatically apply to the devices and accounts or to otherwise initiate the updates.

BACKGROUND

Operations of computing devices are increasingly complex, with a variety of configuration settings that affect device security and performance. For example, smartphones and other mobile computing devices often have settings of various types that affect the security of how the computing devices operate, such as in response to attempted unauthorized intrusions, and user accounts similarly often have settings of various types that affect the security of access to the user accounts. However, certain security settings may have unwanted effects in certain situations, such as to reflect how a computing device and/or user account is being used. While attempts to automatically configure device and account settings may increase effectiveness of the devices in some situations if they are performed correctly, problems exist with existing techniques for such device and account operation management, including in balancing security and other functionality in light of how particular computing devices and user accounts are used.

BRIEF DESCRIPTION OF THE DRAWINGS

FIGS. 1B-1C are flow diagrams illustrating example embodiments of a system for automatically causing updates in settings of devices and/or accounts.

FIGS. 2A-2F are diagrams illustrating examples of generating and using a decision structure for use in effectively updating settings of computing devices and/or accounts.

FIGS. 3A-3B illustrate a flow diagram of an example embodiment of an Automated Configuration Settings Manager (ACSM) System routine.

DETAILED DESCRIPTION

Figure 1A:
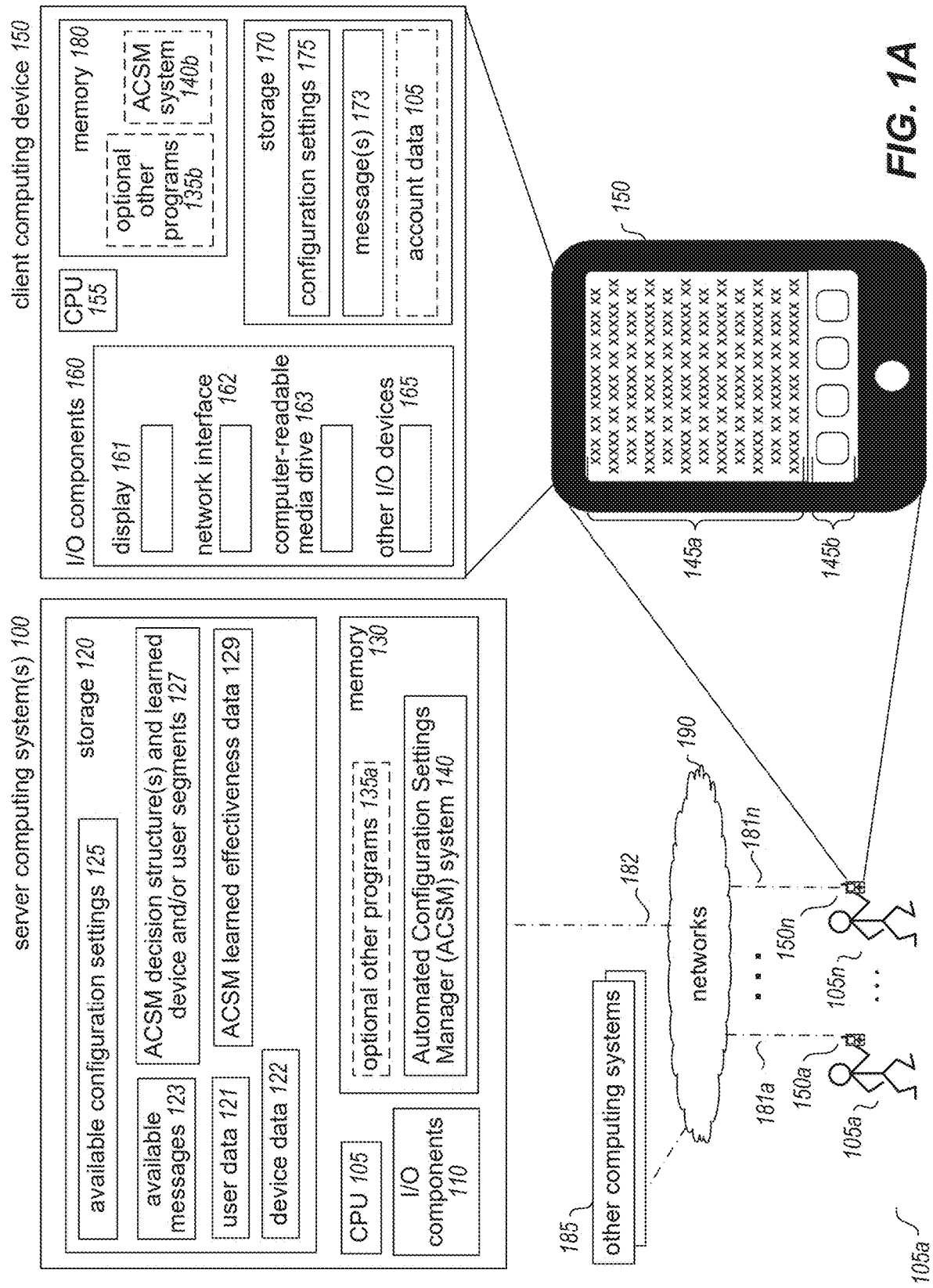
FIG. 1A is a network diagram illustrating an example environment in which a system is provided and used for automatically causing updates in settings of devices and/or accounts, including illustrating example computing systems suitable for executing an embodiment of such a system.

Techniques are described for automatically updating settings of computing devices and/or accounts, such as to in at least some embodiments improve security of the computing devices and/or accounts by modifying security-related configuration settings on the computing devices and/or accounts to prevent unauthorized intrusions. In at least some embodiments, the techniques include analyzing the effectiveness of particular configuration settings in light of attempted intrusions, such as in response to messages (e.g., phishing messages) sent to users who control the computing devices and/or accounts to prompt them to perform inappropriate actions that affect security (e.g., actions inconsistent with a defined security policy)—the configuration settings to automatically apply and/or messages to be sent may in at least some embodiments be selected in a manner that learns and exploits effective configuration settings by using them more frequently while continuing to explore other configuration settings in an attempt to identify more effective configuration settings (e.g., by using reinforcement learning with a selection policy based on multi-armed bandit techniques with Thompson Sampling), such as to learn effective configuration settings and/or messages for particular learned groups of computing devices and/or users. The described techniques may further include generating one or more decision structures (e.g., one or more decision trees) whose leaf nodes each represents a learned segment with a group of computing devices and/or users who share common attributes, including in some embodiments to generate a plurality of decision trees corresponding to random samples of the overall data and having varying branches between their root and leaf nodes based on devices and/or accounts, messages and users corresponding to those random samples, and to further assess the most effective configuration settings and/or messages with respect to one or more defined performance metrics (e.g., attempted intrusions blocked, intrusions not prevented, etc.). In addition, in at least some embodiments, one or more trained large language models (LLMs) are used to further generate new messages by modifying aspects of existing messages, such as to select and supply each of one or more of the existing messages to the LLM(s) with a prompt that includes instructions on types of changes to make in the generated new messages, and with the generated decision structure(s) subsequently updated to reflect performance of applied configuration settings in light of the new messages. Additional details are included below regarding automatically managing updates in settings of devices and/or accounts in particular manners, and in at least some embodiments, some or all of the described techniques are performed by automated operations of a computer-implemented Automated Configuration Settings Manager (ACSM) system, as discussed in greater detail below.

As noted, the ACSM system in at least some embodiments performs automated techniques to analyze effectiveness of particular applied security-related configuration settings for computing devices and/or accounts in light of attempted intrusions caused at least in part by messages (e.g., phishing messages) that are sent to users who control the computing devices and/or accounts and that prompt them to perform inappropriate actions that affect security. The security-related configuration settings may be of various types in various embodiments, with non-exclusive examples including the following: device firewall settings, including with respect to particular ports and/or communication protocols; virus and other malware detection settings, such as to use the most recent detection signatures and to perform scans according to specified criteria; software update settings, such as to use the most updated software versions and to perform corresponding checks according to specified criteria; user authentication settings, such as to use biometrics and/or multi-factor authentication; etc. In addition, the phishing messages or other security-related messages may be of various types in various embodiments, such as to prompt a respective user of an associated computing device and/or account to supply login information or other personal or confidential information that may be used by the ACSM system to attempt an unauthorized access to the associated computing device and/or account, to prompt the user to disable or otherwise change one or more existing protective settings (e.g., a security-related configuration setting that was automatically applied by the ACSM system), etc. In such embodiments, after one or more particular security-related configuration settings are applied to a particular computing device and/or account, one or more associated messages may be selected and sent to an associated user of that computing device and/or account, such as to test the effectiveness of the applied security-related configuration setting(s) by prompting one or more user actions to which the applied security-related configuration setting(s) correspond, while in other situations the one or more selected messages may more generally be associated with security on the associated computing device and/or account without being specific to the applied security-related configuration setting(s). Additional details are included below regarding analyzing the effectiveness of security-related configuration settings applied to computing devices and/or accounts in light of associated messages sent to users who control the computing devices and/or accounts.

In addition, the ACSM system in at least some embodiments performs automated techniques to analyze effectiveness of particular messages sent to users associated with computing devices and/or accounts that prompt actions related to one or more particular configuration settings of the computing devices and/or accounts, including for messages that prompt the users to approve or make particular configuration setting change(s) (e.g., in situations in which beneficial configuration setting change(s) cannot be or have not been automatically applied to associated computing devices and/or accounts). In such embodiments, the effectiveness of the messages may be based on whether the messages cause or are otherwise associated with results involving the users approving and/or making the particular configuration setting change(s) prompted in the messages, including in some situations based on the recipient user selecting one or more user-selectable links included in the sent messages that initiate the approval of and/or performance of the particular configuration setting change(s), or based on the recipient user otherwise performing one or more other indicated actions. The particular configuration setting change(s) may be of the same or similar types to those that are automatically applied in other embodiments (e.g., device firewall settings, virus and other malware detection settings, software update settings, user authentication settings, etc.), or in some embodiments and situations may be of other types (e.g., to turn on or activate a particular type of functionality, to change a type of the account, etc.), and the selected messages may prompt the users to approve or make particular configuration setting change(s) in various manners (e.g., via user selection of one or more user-selectable links included in a message, via instructions for a user to perform on an associated computing device and/or while interacting with an associated account or provider of the account, etc.). Additional details are included below regarding analyzing the effectiveness of messages sent to users associated with computing devices and/or accounts to prompt actions related to particular configuration setting(s).

As noted above, the ACSM system in at least some embodiments performs automated techniques to select one or more messages to be sent to a particular user and/or configuration settings for an associated computing device and/or account in a manner that learns and exploits effective messages and/or configuration settings (e.g., for particular learned groups of users and/or computing devices) by using them more frequently while continuing to explore other messages and/or configuration settings in an attempt to identify more effective messages and/or configuration settings, such as by using reinforcement learning with a selection policy based on multi-armed bandit techniques and Thompson Sampling, or alternatively using one or more other message selection strategies. Such automated techniques may include, for example, selecting a group of available users (e.g., a subset of all available users), and for each of those users, selecting one or more available messages that each prompts the recipient to make one or more configuration settings to the recipient's associated computing device and/or account, and then sending the selected message(s) to the user, including in at least some situations to send multiple selected messages to the user in a specified sequence (e.g., using a specified timing or other specified criteria to determine when to send a next message)—using such techniques, if no information is available on message effectiveness (e.g., if none of the messages have been previously sent), the initial message selection may be random, while if some information is already available on message effectiveness, more effective messages may be more likely to be selected, although other message selection strategies may operate otherwise (e.g., performing random message selection for a first 'exploration' period of time, followed by use of learned message effectiveness from the exploration period of time during a subsequent second 'exploitation' period of time).

In addition, in at least some embodiments, the message selection activities may be performed as part of or to assist in generating one or more decision trees or other decision structures that are used in learning segments of users and/or computing devices and in measuring effectiveness of sent messages. As one non-exclusive example, various messages may be selected from a plurality of available messages and sent to various users selected from a plurality of available users until a minimum threshold amount of results data is available, with results determined (e.g., whether prompted configuration setting changes occur) based on monitoring activities (e.g., users' actions, associated computing devices and/or an associated accounts) in response to sent messages, and various subsets of that results data may then be selected and used to generate and train each of one or more decision trees (e.g., using up to 68% of the available results data for a given decision tree)—in such a situation, the users of the results data subset for a given decision tree are associated with the root node of the decision tree and the root node is selected as the current node, information about those current users of that current node and their sent messages are analyzed to determine an attribute and optionally associated values (e.g., a particular message sent, a user attribute, a message attribute, an associated device attribute, etc.) to split those current users into two or more subsets (e.g., approximately equal subsets, and assuming a sufficient quantity of users to split in accordance with defined tree growth settings, such as to meet a threshold of at least 20, at least 47, etc.), a corresponding quantity of child nodes are created under the current node that are each associated with one of those subsets of users (e.g., each with at least 10 users), a test with the attribute and optionally associated values is associated with the current node, and the process then continues after selecting another current lowest-level node (e.g., one of the child nodes that were just created, a root node of another decision tree, etc.) with sufficient users to split until one or more defined tree growth stopping criteria are reached, such as a maximum number of decision trees (e.g., 5, 10, 50, 98, 100, 500, 1000, etc.) and/or a maximum depth of each decision tree (e.g., 5, 10, 50, 53, 100, 500, 1000, etc.) and/or all lowest-level nodes being below the minimum quantity of users to split. When associating users with a root node of a decision tree, the associated users may in some embodiments be at most a maximum subset of all available users (e.g., up to 68%), such as to use different variations of subsets of the available users (and/or of other factors, such as tree growth and/or growth stopping configuration settings, a subset of messages and/or message attributes, etc.) to associate with root nodes of different decision trees, and when considering attributes to use in splitting the users associated with a current node, the attributes considered may in some embodiments be at most a maximum subset of all available attributes (e.g., up to 35.4%). Attributes of a user, computing device, account, message or other entity may include any measurable aspect of that entity, such as, for example, with respect to a user including demographic information, financial information, information about selected account features and/or functionality, etc., and with respect to a message including a type of prompted action, an associated configuration setting, a message identifier, a message topic, a message tone, an included message graphical item such as an image, other visual characteristics of the message (e.g., colors, font type, font size, etc.), message text, a type or class of intended recipient user, etc. While various examples of attributes are included herein, it will be appreciated that the described techniques are not limited to these exemplary details.

As another non-exclusive example, a particular decision tree may be generated iteratively by associating some or all available users with a root node of that decision tree and then selecting that root node as the current node, and then the users associated with that current node are selected to receive messages—after messages are sent for a sufficient quantity of users (e.g., at least 20, at least 47, etc.) and corresponding results are determined, the techniques may include analyzing the results to determine an attribute and optionally associated values to split the selected users into two or more subsets (e.g., approximately equal subsets), and then creating a corresponding quantity of child nodes under the current node that are each associated with one of the subsets of users, and associating a test with the attribute and optionally associated values with the current node. This procedure may continue by selecting one of the lowest-level nodes (e.g., one of the newly created child nodes, a root node on another decision tree) as a current node and the users associated with that current node, and continuing the procedure until one or more defined stopping criteria are reached, such as a maximum number of decision trees (e.g., 5, 10, 50, 98, 100, 500, 1000, etc.) and/or a maximum depth of each decision tree (e.g., 5, 10, 50, 53, 100, 500, 1000, etc.) and/or all lowest-level nodes being below the minimum quantity of users to split.

After decision tree generation is completed, users associated with each leaf node of the one or more decision trees may then be analyzed to determined common shared attributes, such as with respect to some or all of user attributes, device attributes, account attributes, configuration setting attributes, message attributes, prompted action attributes, etc. In addition, information about the users associated with some or all leaf nodes may be further analyzed to determine aggregate results in prompting setting changes for those users based at least in part on message attributes of messages sent to those users, such as to determine an objective function for each node that represents or provides one or more likelihoods of those setting changes occurring for additional users (e.g., changes on accounts of those additional users) who match the learned group for that leaf node (e.g., share any user and/or device attributes used for splits in that decision tree to reach that leaf node) and who receive one or more messages that match messages for the learned group for that leaf node (e.g., share any message attributes used for splits in that decision tree to reach that leaf node, or otherwise share message attributes with shared messages sent to the users in the learned group for that leaf node). Also, while the decision tree(s) or other decision structure(s) may in some embodiments be generated and then subsequently used without further modification, in other embodiments the decision tree(s) or other decision structure(s) are repeatedly (e.g., continuously or near-continuously) updated to reflect additional analysis of the continuing effectiveness of configuration settings and/or messages that prompt users to approve or make preferred configuration setting changes, including with respect to changes in available messages to use. Additional details are included below regarding generating decision trees or other decision structures and regarding selecting messages, including with respect to the examples of FIGS. 2A-2F.

As noted above, the ACSM system in at least some embodiments also performs automated techniques to use one or more trained large language models (LLMs) to generate new messages by modifying aspects of existing messages, such as to select and supply each of one or more of the existing messages to the LLM(s) with a prompt that includes instructions on types of changes to make in the generated new messages. In such embodiments, an LLM prompt may be generated in various manners (e.g., using one or more prompt engineering techniques), and may include indications of one or more message attributes to modify in a selected existing message, optionally including one or more examples (e.g., if a visual graphic is to be modified, examples of one or more new candidate visual graphics to use), and with the message attribute(s) to modify being predefined or otherwise determined (e.g., to try some or all message attributes)—for example, in some embodiments, one or more message attributes to modify may be determined based on ongoing learning from an optimization model of the ACSM system that is based upon the message attributes driving decision tree splits for which the performance metric is high and/or increasing over time. One or more existing messages may be selected to be used in various manners in various embodiments, such as to select one or more of the most effective messages so far with respect to one or more performance metrics (e.g., percentage of or other measure of multiple copies of a sent message that result in its prompted configuration setting changes occurring or that otherwise satisfy one or more defined criteria), such as based on likelihood(s) associated with corresponding decision trees (e.g., to select one or more existing messages that have message attributes associated with decision tree leaf nodes having high associated likelihoods of prompting a target settings change). In addition, in at least one embodiment, at least one of messages, message elements or other message attributes, or LLM-based embedding features of a message may be selected as prompting for the generation of new messages or message components. The LLM(s) may be of various types in various embodiments (e.g., transformer models, other neural networks, etc., including encoder-decoders, causal decoders and/or prefix decoders), and may be trained in various manners (e.g., in a manner specific to one or more domains corresponding to subject matter of the messages, in a general manner that is not specific to any particular such domains, etc.). Once new messages are generated, they may be added to a group of available messages for further use, and optionally one or more of the previously existing messages may be removed from further use (e.g., based on having an effectiveness level below a defined threshold, based on having been used for a defined amount of time and/or with a defined quantity of users, etc.)—in at least some embodiments and situations, only some of the generated new messages may be added to the group of available messages, such as those identified based on manual review and feedback, and/or using other automated assessment (e.g., using a machine learning-based model). In addition, after one or more new messages are generated, one or more existing generated decision trees or other decision structures may in at least some embodiments be subsequently updated to reflect effectiveness of the new messages after they are sent to users.

The described automated techniques provide various benefits in various embodiments, including to learn and exploit the most effective security configuration settings for computing devices and/or accounts, and/or to learn and exploit the most effective messages that prompt users to approve or make desired configuration settings. In at least some embodiments, the benefits are achieved at least in part by using particular types of generated decision structures (e.g., one or more decision trees), particular types of selection strategies for configuration settings and/or messages (e.g., reinforcement learning with a selection policy based on multi-armed bandit techniques and Thompson Sampling), and/or particular techniques to generate new configuration settings and/or messages to evaluate and use (e.g., using one or more LLMs to generate new configuration settings and/or messages based on selected effective configuration settings or messages, respectively, along with prompt instructions that specify how to modify the selected configuration settings or messages). Additional benefits are described throughout this document and will be apparent to those of ordinary skill in the art in light of the disclosure herein.

For illustrative purposes, some embodiments are described below in which specific types of operations are performed, including with respect to using the described techniques with particular types of computing devices, device attributes and other attributes, decision structures, message generation and/or types of measured performance effects. These examples are provided for illustrative purposes and are simplified for the sake of brevity, and the inventive techniques may be used in a wide variety of other situations, including with other types of automated decisions of which actions to perform in other types of settings, some of which are discussed below—accordingly, it will be appreciated that the described techniques are not limited to use with the example embodiments discussed below. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 1A is a network diagram that includes information 105a illustrating an example environment in which a system is provided and used for automatically causing updates in settings of devices and/or accounts, including illustrating example computing systems suitable for executing an embodiment of such a system.

In particular, FIG. 1A illustrates example users 105 who each has a client computing device 150 that has one or more types of communication capabilities (e.g., wireless communication capabilities, such as Wi-Fi, a cellular connection, Bluetooth, etc.), such as smartphone computing devices or other mobile or non-mobile computing devices (e.g., a tablet computer, laptop computer, desktop computer, etc.). The client computing device 150n of example user 105n is illustrated in additional detail, such as to include a smartphone device or tablet device with a touch-sensitive display. In this example, the display is separated into sections 145a and 145b by a graphical user interface ("GUI") displayed on the device 150n, with the portion 145b being used in this example to provide user-selectable functionality controls (e.g., buttons or icons), and the separate portion 145a being used to display or otherwise present various information to the user—while not illustrated, the portion 145a may display one or more user-selectable links and/or other user-selectable controls. It will be appreciated that in other embodiments a device may have other types of GUIs (or no GUI).

In the illustrated embodiment, additional details are further shown regarding example internal components of the client device 150. In particular, in this example, client device 150 is suitable for performing at least some of the described techniques, such as by optionally executing an embodiment of some or all of an Automated Configuration Settings Manager (ACSM) system 140b, as discussed further below. The example device 150 includes one or more hardware central processing unit ("CPU") processors 155, various hardware input/output ("I/O") components 160, storage 170, memory 180 and may have other components (e.g., one or more batteries, ports, etc.). Illustrated I/O components in this example embodiment include a display 161 (to provide the visual display area 145a and 145b), a network connection interface 162, a computer-readable media drive 163, and other I/O devices 165 (e.g., wireless or attached keyboards, mice or other pointing devices, microphones, speakers, cameras, other sensors, etc.). Other types of hardware components may additionally be present (e.g., one or more IMUs, or inertial measurement units; other processors, such as a GPU, or graphics processing unit; etc.), but are not illustrated in this example. In this example, each client computing device 150 may include various components in storage and/or memory, such as one or more store configuration settings 175, one or more received messages 173, optionally account data 105 for an associated user, optionally one or more other executing programs 135b in memory 180, etc.

One or more server computing systems 100 and one or more other network-accessible computing systems 185 are also illustrated, and may each have internal components similar to those of client device 150, although corresponding details are not illustrated in this example for computing system(s) 185 for the sake of brevity. With respect to the server computing system(s) 100, each includes one or more hardware central processing unit ("CPU") processors 105, various hardware I/O components 110, storage 120, and memory 130—the particular I/O components 110 are not illustrated in this example, but may be the same as or similar to those of I/O components 160, and other types of hardware components may similarly be present (e.g., one or more IMUs, or inertial measurement units; other processors, such as a GPU, or graphics processing unit; etc.), but are not illustrated in this example. In this example, the one or more server computing systems 100 are executing a copy of the ACSM system 140 in memory 130 to support interactions with a variety of users 105 and associated computing devices 150, as well as optionally executing one or more other programs 135a. As part of the operations of the ACSM system 140, the system may store and/or retrieve various data, including to use information about available types of configuration settings 125 who apply on associated computing devices and/or accounts, available messages to send 123, user data 121 about various users 105 (e.g., including data about accounts to which the users subscribe or belong or otherwise use), device data 122 about various computing devices 150, data 127 about ACSM decision structures that are generated with associated learned device and/or user segments, and data 129 about learned effectiveness of particular configuration settings and/or messages.

The various illustrated computing systems and computing devices may interact via communications sent over one or more intervening networks 190, such as interactions 182 and 181 between the server computing system(s) 100 and users' computing devices 150 in which the ACSM system selects available configuration settings to apply on particular computing devices 150 and/or particular available messages to send to users via their associated computing devices, in which the computing devices 150 may initiate changes to users' accounts in response to actions of the users on their respective computing devices, and in which the computing devices 150 may send information in response to other actions of the users on their respective computing devices (e.g., other responses to phishing messages or other messages). For example, network 190 may include portions of the Internet, a private network (e.g., a corporate network), a cellular network, or any other networks, including combinations of one or more such networks.

As noted above, one or more embodiments of the ACSM system 140 may be used in the illustrated example to perform some or all of the described techniques, such as an ACSM system copy 140 that is executing in memory 130 of one or more server computing systems 100, and optionally an ACSM system copy 140*b* executing on each of one or more client devices 150—if an ACSM system copy is executing on a particular computing device 150, it may perform operations to assess the primary ACSM system 140 on the one or more server computing systems, such as to track activities that are performed on the computing device in response to one or more received messages, including changes to configuration settings on the computing device.

It will be appreciated that the illustrated computing systems and devices are merely illustrative and are not intended to limit the scope of the present invention. For example, computing system(s) 100 and/or client devices 150 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs ("application-specific integrated circuits") or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 140 and/or its modules may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 105 and/or CPU(s) 155 and/or other hardware processor means, program the processor(s) to automatically perform the described operations for that component/system, including to use and execute routines and other algorithms as described herein. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 1B:
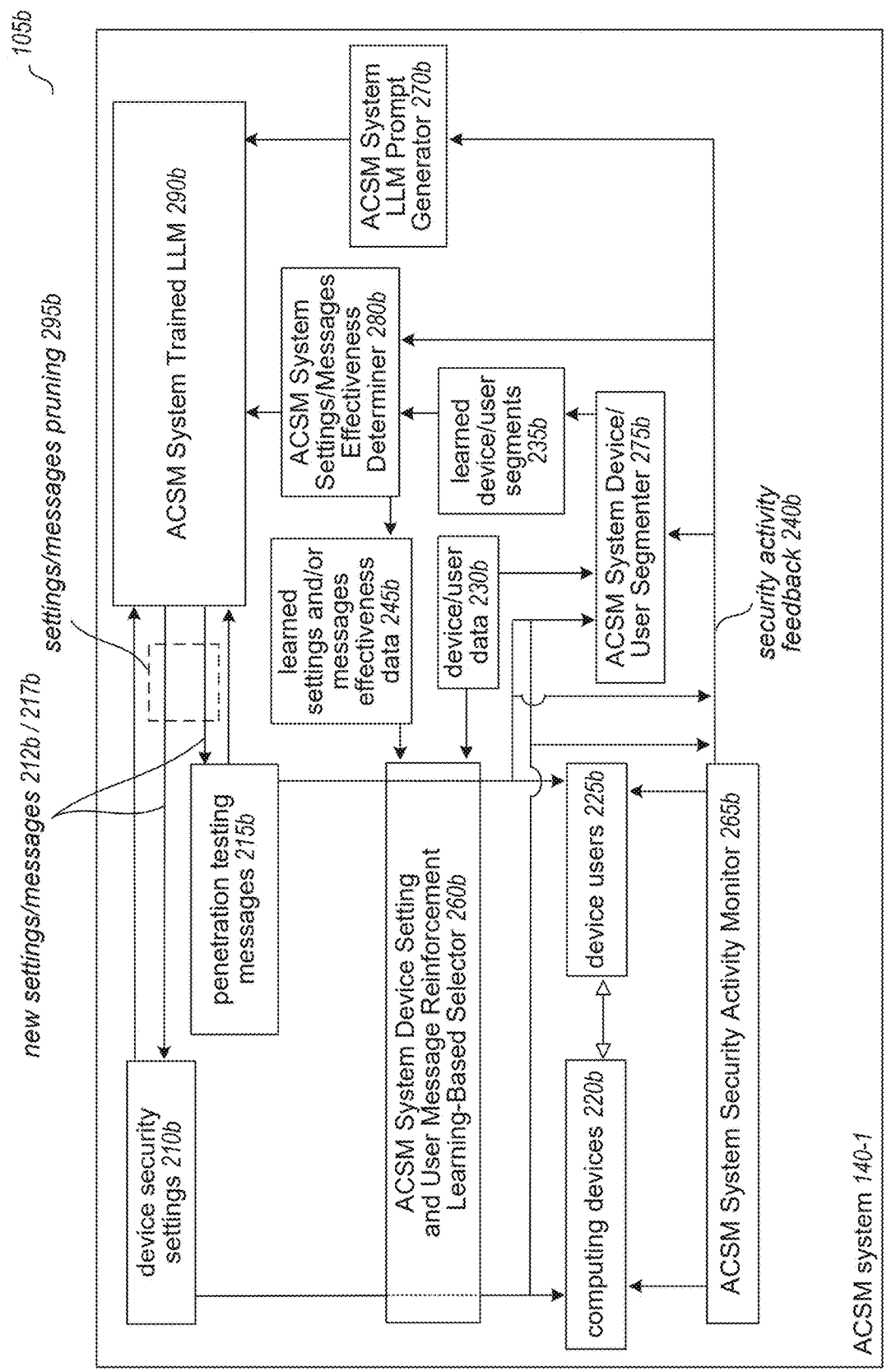

FIGS. 1B-1C are flow diagrams including information 105*b* and 105*c*, respectively, illustrating example embodiments of the ACSM system for automatically causing updates in settings of devices and/or accounts. In particular, with respect to FIG. 1B, an example embodiment 140-1 of the ACSM system is illustrated that includes various modules to perform automated techniques to analyze effectiveness of particular applied security-related configuration settings for computing devices and/or accounts in light of attempted intrusions caused at least in part by messages (e.g., phishing messages) that are sent to users who control the computing devices and/or accounts and that prompt them to perform inappropriate actions that affect security, such as to identify the most effective security settings to be applied to the computing devices to improve device security. In this example embodiment, various computing devices 220*b* and associated device users 225*b* are illustrated, along with various device/user data 230*b*, available device security settings 210*b* and available penetration testing messages 215*b*. An ACSM System Device Setting and User Message Reinforcement Learning-Based Selector module 260*b* is illustrated that selects one or more device security settings 210*b* to apply to each of one or more computing devices 220*b*, such as by using data 245*b* about learned effectiveness of particular configuration security settings if available and using available device/user data 230*b*, and applies those selected settings to those computing devices. Similarly, the module 260*b* selects, for each of the one or more computing devices, one or more penetration testing messages 215*b* to send to the user associated with that computing device, such as messages associated with the applied configuration settings and by using available device/user data 230*b*, and sends the selected messages to that user (e.g., via the computing device associated with that user). An ACSM System Security Activity Monitor module 265*b* then monitors activities performed by those users and/or their associated computing devices to determine responses, if any, to the sent messages in light of the applied security settings, and provides corresponding security activity feedback 240*b* to the ACSM System Device/User Segmenter module 275*b*, the ACSM System Settings/Messages Effectiveness Determiner module 280*b*, and the ACSM System LLM Prompt Generator module 270*b*. The module 275*b* uses the security activity feedback, and information about the sent messages and applied configuration settings and about the devices and users, to generate one or more decision trees or other decisions structures that include learned device/user segments 235*b* each including a group of devices and/or users having common shared attributes. The module 280*b* uses the security activity feedback and information about the learned device/user segments 235*b* to measure the effectiveness of particular applied security settings and optionally particular sent messages, and generates corresponding learned settings and/or messages effectiveness data 245*b*. In addition, the module 270*b* generates one or more prompts to supply to the ACSM System Trained LLM module 290*b* to provide instructions related to modifying one or more existing penetration testing messages 215*b* (e.g., selected using learned message effectiveness data 245*b*) to generate one or more new penetration testing messages 217*b*, optionally using the security activity feedback 240*b* to determine particular message attributes to modify in the existing penetration testing message(s)—after optional pruning activities 295*b* to remove zero or more of the generated new penetration testing messages, any remaining new penetration testing messages are added to the messages 215*b* for further use by the module 260*b*, and one or more of the previously existing messages 215*b* may optionally be removed from further use (not shown) if they satisfy one or more defined removal criteria. In addition, the module 270*b* may further optionally generate one or more prompts to supply to the module 290*b* to provide instructions related to modifying one or more existing device security settings 210*b* (e.g., selected using learned settings effectiveness data 245*b*) to generate one or more new device security settings 212*b*, optionally using the security activity feedback 240*b* to determine particular settings attributes to modify in the existing device security setting(s)—after optional pruning activities 295*b* to remove zero or more of the generated new device security settings, any remaining new device security settings are added to the settings 210*b* for further use by the module 260*b*, and one or more of the previously existing device security settings 210*b* may optionally be removed from further use (not shown) if they satisfy one or more defined removal criteria. In this manner, the illustrated embodiment of the ACSM system performs automated techniques to analyze effectiveness of particular applied security-related configuration settings for computing devices and/or accounts in light of attempted intrusions caused at least in part by messages that are sent to users who control the computing devices and/or accounts and that prompt them to perform inappropriate actions that affect security, and may perform further automated operations (not shown) to apply some or all of the most effective settings to some or all of the computing devices.

In a similar manner, FIG. 1C illustrates an example embodiment 140-2 of the ACSM system that includes various modules to perform automated techniques to analyze effectiveness of particular messages sent to users associated with computing devices and/or accounts that prompt actions related to one or more particular configuration settings of the computing devices and/or accounts, including for messages that prompt the users to approve or make particular configuration setting change(s) (e.g., in situations in which beneficial configuration setting change(s) cannot be or have not been automatically applied to associated computing devices and/or accounts), such as to identify and then further use the most effective messages to improve device and/or account security or other functionality. In this example embodiment, various computing devices 220*c* and associated device users 225*c* are illustrated, along with various device/user data 230*c* and available settings modification prompt messages 215*c*. An ACSM System Device and User Reinforcement Learning-Based Message Selector module 260*c* is illustrated that selects, for each of the one or more computing devices, one or more settings modification prompt messages 215*c* to send to the user associated with that computing device, such as by using available device/user data 230*c*, and sends the selected messages to that user (e.g., via the computing device associated with that user). An ACSM System Settings Activity Monitor module 265*c* then monitors activities performed by those users and/or their associated computing devices to determine responses, if any, to the sent messages corresponding to settings changes, and provides corresponding settings activity feedback 240*c* to the ACSM System Device And/Or User Segmenter module 275*c*, the ACSM System Message Effectiveness Determiner module 280*c*, and the ACSM System LLM Prompt Generator module 270*c*. The module 275*c* uses the settings activity feedback, and information about the sent messages and about the devices and users, to generate one or more decision trees or other decisions structures that include learned device and/or user segments 235*c* each including a group of devices and/or users having common shared attributes. The module 280*c* uses the settings activity feedback and information about the learned device and/or user segments 235*c* to measure the effectiveness of particular sent messages, and generates corresponding learned messages effectiveness data 245*c*. In addition, the module 270*c* generates one or more prompts to supply to the ACSM System Trained LLM module 290*c* to provide instructions related to modifying one or more existing settings modification prompt messages 215*c* (e.g., selected using learned message effectiveness data 245*c*) to generate one or more new settings modification prompt messages 217*c*, optionally using the settings activity feedback 240*c* to determine particular message attributes to modify in the existing settings modification prompt message(s)—after optional pruning activities 295*c* to remove zero or more of the generated new settings modification prompt messages, any remaining new settings modification prompt messages are added to the messages 215*c* for further use by the module 260*c*, and one or more of the previously existing messages 215*c* may optionally be removed from further use (not shown) if they satisfy one or more defined removal criteria. In this manner, the illustrated embodiment of the ACSM system performs automated techniques to analyze effectiveness of particular messages sent to users associated with computing devices and/or accounts that prompt actions related to one or more particular configuration settings of the computing devices and/or accounts, including for messages that prompt the users to approve or make particular configuration setting change(s), and may perform further automated operations (not shown) to further use some or all of the most effective messages to initiate settings changes on some or all of the computing devices and/or accounts associated with the users.

FIGS. 2A-2F are diagrams illustrating examples of generating and using a decision structure for use in effectively updating settings of computing devices and/or accounts.

Figure 2A:
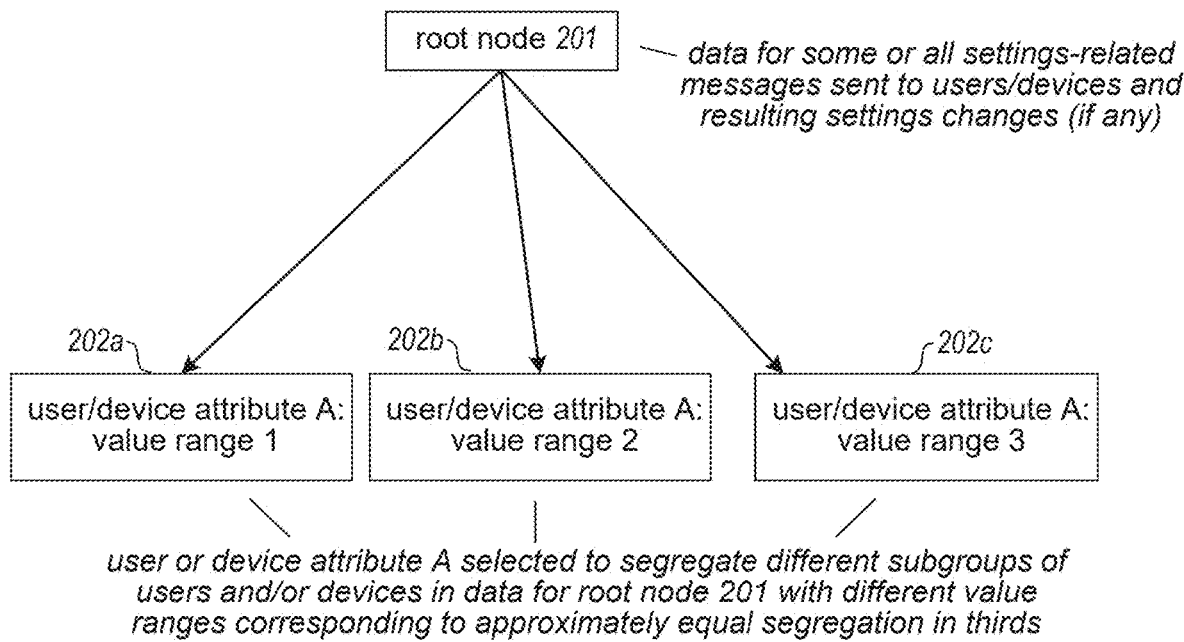

In particular, FIG. 2A includes information 205a illustrating an example of beginning the generation of a hierarchical decision tree to learn segments of computing devices and/or users who have shared common attributes, for use in measuring effectiveness of applied computing device and/or account settings in light of associated sent messages for users and computing devices of one or more learned segments, and/or for use in measuring effectiveness of sent messages in causing prompted settings changes to associated computing devices and/or accounts for users and computing devices of one or more learned segments. In the illustrated example, several nodes 201 and 202 are illustrated, which each includes associated information of one or more types. In particular, in the illustrated example, training data has been obtained that represents settings-related messages sent to a plurality of users associated with configuration settings on computing devices and/or accounts of the users, such as for tens or hundreds or thousands of users who have each received one or more selected messages, and with those users and the associated messages being part of training data that will be used to generate the decision structure, and with learned segments of users and/or devices in the decision structure later used to, for example, measure effectiveness of sent messages in causing prompted settings changes to associated computing devices and/or accounts in order to identify and further use the most effective messages to cause beneficial settings changes for these and/or other users and their associated computing devices and/or accounts.

The generation of the decision structure begins in this example with the creation of a root node 201, with training data information associated with the root node about at least some of the users in the training data to whom messages have been sent and about the associated sent messages and optionally about those users' associated computing devices and/or accounts. In order to further generate the decision structure, an analysis is performed on the training data associated with the root node 201 in order to identify an attribute (e.g., a user attribute, device attribute, sent message identifier or other message attribute, etc.) that enables separation of the users and/or devices associated with the root node into two or more approximately equal subsets. In this example, a user or device attribute A is chosen based on the automated analysis (e.g., user age or device RAM amount), with three child nodes 202a, 202b and 202c created to each correspond to one of three possible values or value ranges used for the selected attribute, and with the corresponding split subset of users and/or devices for each of the child nodes associated with that child node along with their associated training data. While not illustrated in this example, a test associated with the selected attribute and associated values (if any) may be included with the current node (root node 201), such that later traversal of the decision tree for another user and associated computing device may move from the root node to a correct one of its child nodes that matches corresponding attributes associated with that other user and associated computing device (e.g., which of the value ranges 1, 2 or 3 for user or device attribute A corresponds to the other user and/or their computing device).

Figure 2B:
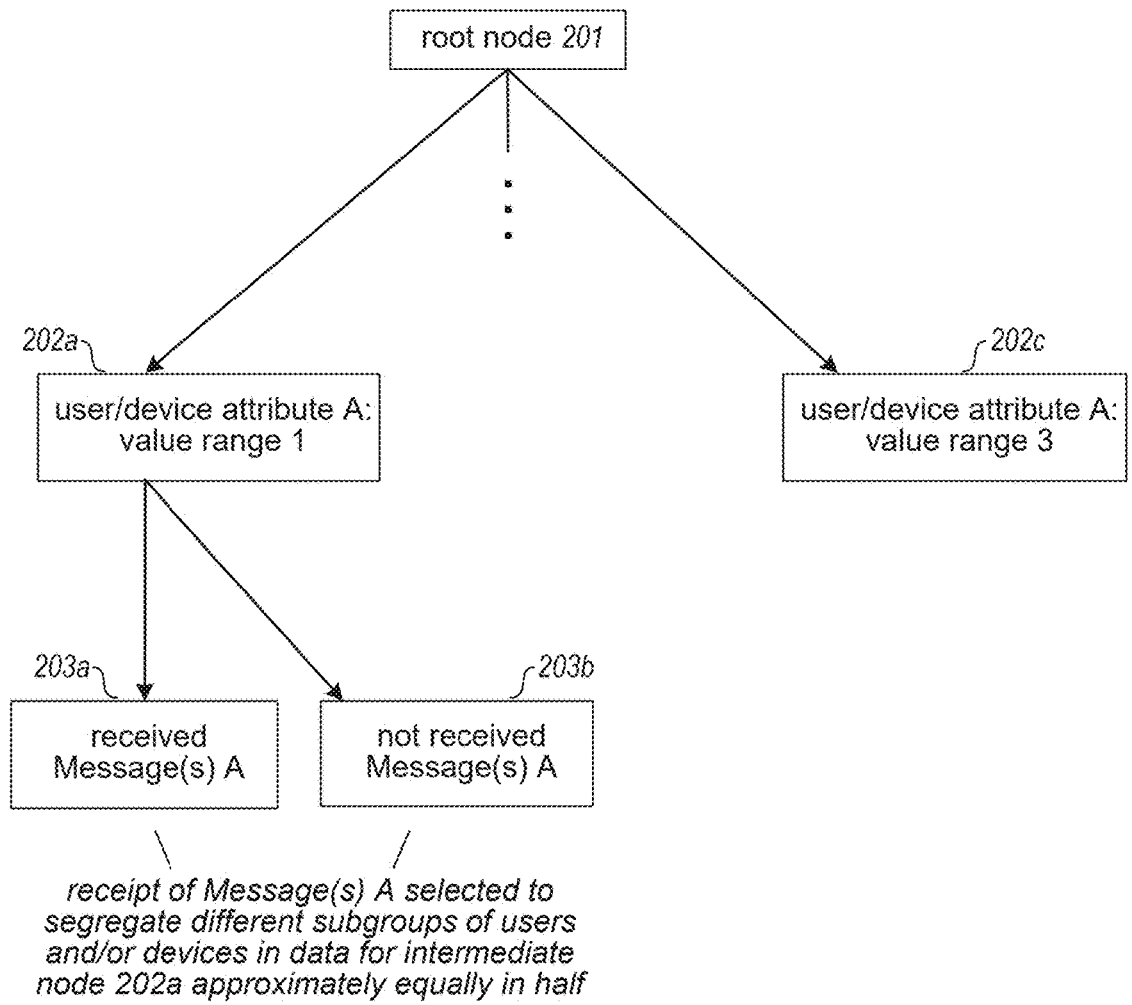

FIG. 2B continues the example of FIG. 2A, and includes information 205b showing further generation of the decision structure initiated in FIG. 2A. In particular, the information of FIG. 2B includes the root node 201 and the first-level intermediate child nodes 202a and 202c (child node 202b is not shown for the sake of brevity), and further illustrates how a second level of child nodes 203a and 203b are created for the child node 202a. In particular, in a manner similar to that previously performed for the root node 201, the subset of the initial training data that is associated with the child node 202a about some of the initial users and/or devices is analyzed in order to identify a next attribute that enables separation of the users and/or devices associated with the current node (node 202a) into two or more approximately equal subsets. In this example, a message-related attribute is chosen based on the automated analysis, with two further child nodes 203a and 203b created to each correspond to whether or not a selected message A has been sent to respective further subsets of the users associated with the current node, and with the corresponding further subset of users and/or devices for each of the child nodes associated with that child node along with those users' training data. While not illustrated in this example, a test associated with the selected attribute and associated values (if any) may be included with the current node (node 202a), such that later traversal of the decision tree for another user and associated computing device may move from the current node to a correct one of its child nodes that matches corresponding attributes associated with that other user and associated computing device (e.g., whether that other user has received message A or not).

Figure 2C:
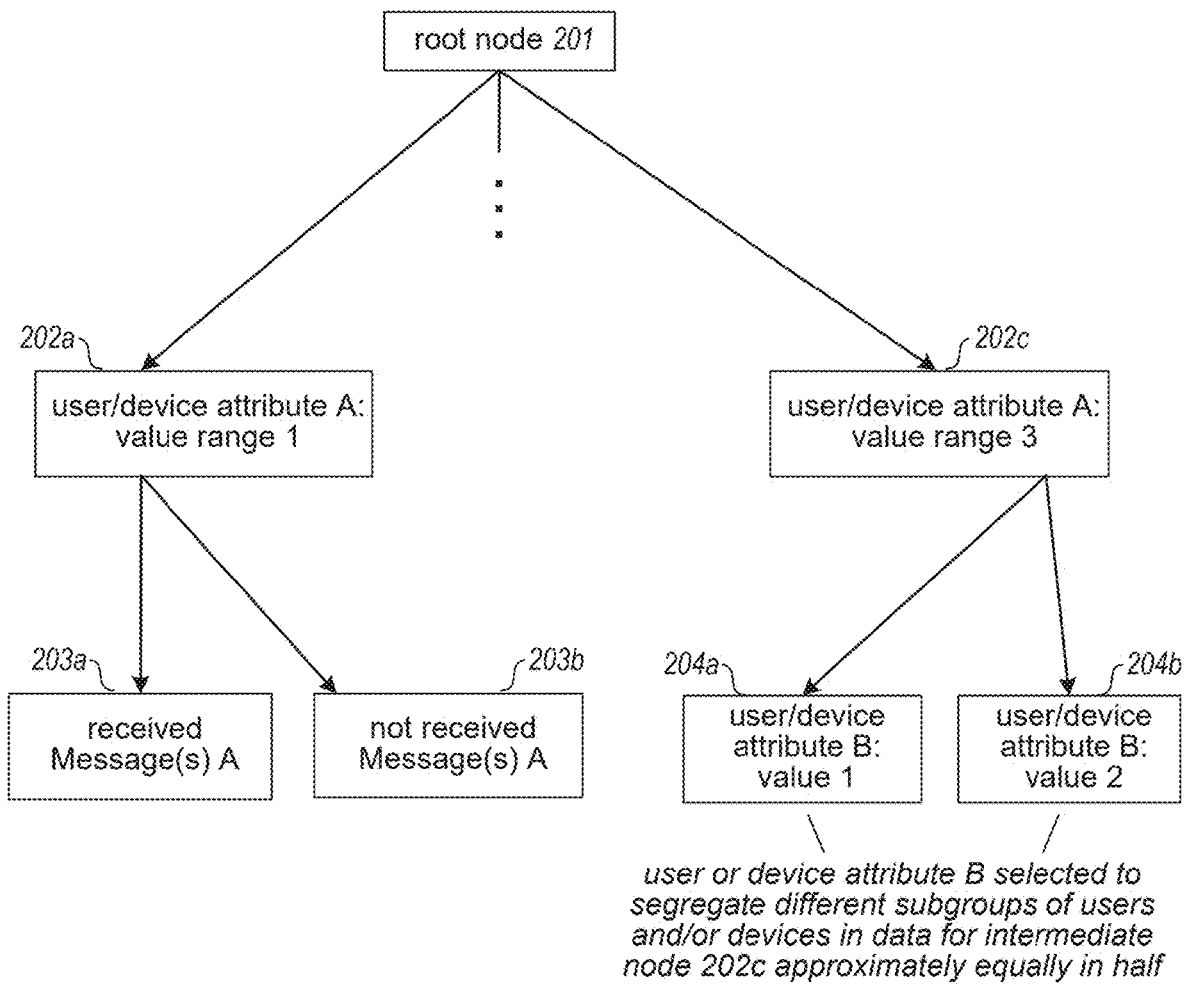

FIG. 2C continues the example of FIGS. 2A and 2B, and includes information 205c showing further generation of the decision structure initiated in FIG. 2A and continued in FIG. 2B. In particular, the information of FIG. 2C includes the root node 201, first-level child nodes 202a and 202c (child node 202b is not shown for the sake of brevity), and second-level child nodes 203a-b for child node 202a. In addition, the decision structure continues to be generated in FIG. 2C by performing actions for first-level child node 202c in a manner similar to that described in FIG. 2B for child node 202a. In particular, the associated training data for current child node 202c is analyzed in order to identify another attribute that best splits the users and/or computing devices in the training data associated with current node 202c into two or more additional subsets of those users and/or computing devices, which in this example is selected to be a different user or device attribute B based on the automated analysis, and with two further child nodes 204a and 204b of node 202c added to the decision structure, with the corresponding additional subset of users and/or devices for each of the child nodes 204a and 204b associated with that child node along with the associated training data. The type of decision structure generation discussed in FIGS. 2B and 2C continues to be performed in the illustrated example until each lowest-level node has a quantity of associated users and/or computing devices that is below a specified splitting threshold (e.g., 47 users) or until other stopping criteria are reached (e.g., a maximum number of decision tree levels).

Figure 2D:
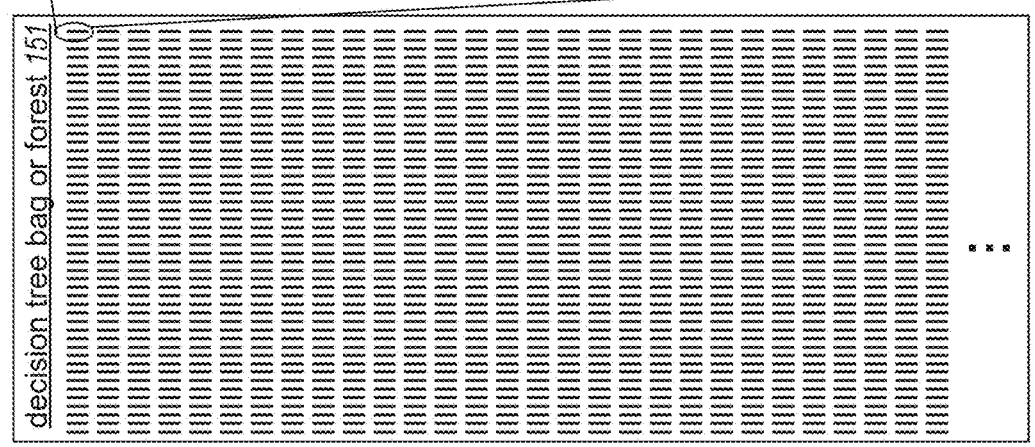

FIG. 2D continues the example of FIGS. 2A-2C, and includes information 205d that illustrates a portion of the decision tree 151a once its generation is completed, which in this example is one of a bag or forest of numerous generated decision trees 151—it will be appreciated that actual decision structures may include a number of additional levels of child nodes or otherwise have different forms in other embodiments. In this example, the generated decision tree 151a has N leaf nodes 206 that each has a different group of users and/or computing devices corresponding to a separate subset of the original users and/or computing devices in the training data associated with the root node 201 for this decision tree—as discussed elsewhere herein, the other decision trees 151 may each have a unique set of training data, such as to correspond to different sub-groups of all available users and/or computing devices for which training data is available. While not illustrated in this example, further analyses may be performed using the various leaf nodes of the various decision trees, such as to identify which leaf nodes correspond to the most effective results with respect to one or more performance criteria, and to identify the messages sent to corresponding segments of users and/or computing devices as the most effective messages for those users and/or computing devices, and or to identify the applied configuration settings to computing devices and/or accounts that had the most effective results with respect to one or more performance metrics—the identified most effective messages and/or most effective configuration settings may then be further used in one or more automated manners, as discussed in greater detail elsewhere herein.

Figure 2E:
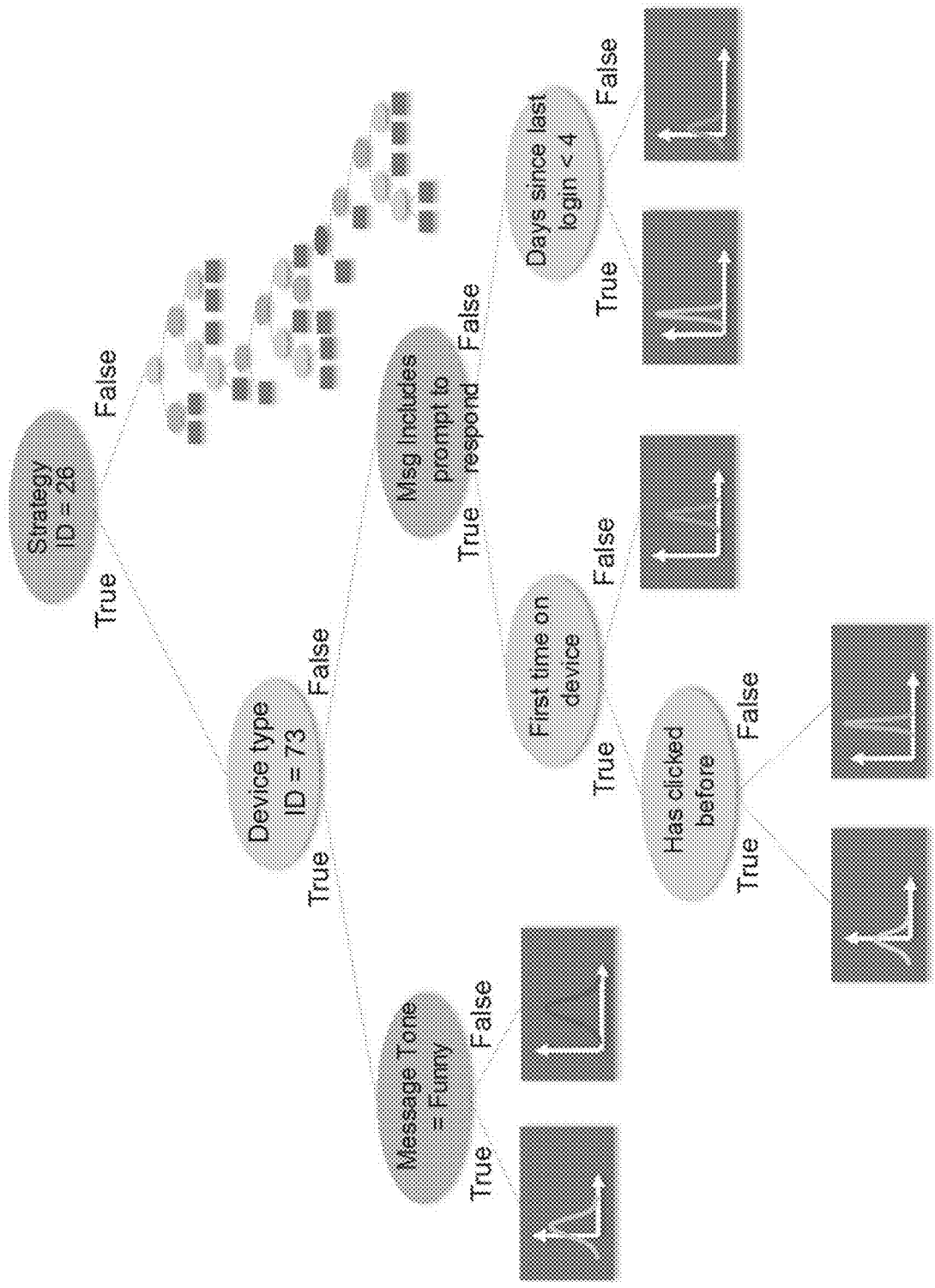

FIGS. 2E-2F continue the examples of FIGS. 2A-2D, and illustrate non-exclusive examples of generated decision trees and techniques for performing the generating and for using the generated decision trees. In particular, FIG. 2E includes information 205e illustrating an example decision tree with particular examples of message attributes, device attributes and user attributes used for the splits at the root node and intermediate nodes. FIG. 2E further illustrates, for each of the leaf nodes, an example likelihood function associated with that leaf node to reflect the actual effectiveness (based on training data available from the generation of the decision tree, and updated as the decision tree continues to be used for additional message selection) for the users associated with that leaf node in achieving prompted settings changes based on the message attributes, device attributes and user attributes associated with that leaf node—as an example, the right-most leaf node (corresponding to the 'False' split of the "Days since last login<4" intermediate node) corresponds to that user attribute (users whose last login was 4 or more days ago), to a message attribute of not including a prompt to respond, to a device type attribute having an identifier other than '73' (e.g., corresponding to a particular type of smart phone), and to messages selected using a defined message strategy having an identifier of "26" (e.g., to send messages using a specified frequency or other schedule, to select multiple messages of particular types in a particular sequence, etc.). In this example, this decision tree (and each of multiple other decision trees, not shown, such as 64 or more) contains a series of splits or branches based on user and message attributes selected by the tree generation algorithm—different decision trees may have differing split arrangements based on sampled features for the objective to be optimized (e.g., one or more particular settings changes to achieve). The leaf nodes at the ends of the tree branches each has an associated microsegment of users and associated messages defined by the splits or path leading to that leaf node, with decision trees able to branch into dozens or more of splits before terminating at a leaf node. In addition, each leaf node in this example represents its one or more associated likelihoods using a probability distribution for an expected objective function based on the user microsegment and associated messages combinations, with the probability distributions updated (e.g., each day) as additional user behavior data is analyzed. FIG. 2F further includes information 205f that illustrates details about how likelihoods are determined for and associated with particular leaf nodes, and are further used in selecting messages to send to users. In particular, the information 205f illustrates how selection and use of particular messages are assessed during experimental measurement in order to determine one or more likelihoods of achieving one or more target or objective setting changes for each microsegment of users associated with a particular decision tree leaf node, and are compared to control data for other sending of messages to users, with the one or more likelihoods expressed in this example as a 'mean lift estimate' to compare the difference in achieving the one or more target or objective setting changes as compared to the control data for each message and message delivery mechanism (e.g., messaging channel), and with the lift estimates or other likelihood data being updated as more training data becomes available from further message sending and corresponding assessment of any resulting settings changes. The multi-armed bandit message selection policy is then used in this example to utilize the assessed mean lift estimates to select particular messages, such as to optimize the tradeoff between message exploration and message exploitation. The decision modeling with bandits processing then organizes the multiple decision trees and bandits into a single model to generalize learnings over user and message attributes. In addition, bagging techniques are used as part of bootstrap aggregation and ranking to increase accuracy and reduce overfitting of the decision trees, with a ranked list of available messages (and in some cases message treatments including message delivery techniques) provided for each user.

As one non-exclusive example embodiment, an ensemble of decision trees is used to inform the value function of a reinforcement learning system executing a Thompson Sampling bandit policy to select between message configurations for given customers. An optimization model of the ACSM system may in this example embodiment be activated in three phases, including test and learn/naïve decisioning; model training; and optimized model launch with periodic (e.g., daily) updates. During the test and learn/naïve decisioning phase, response data is gathered to the naïve messaging proposing device settings or configuration changes that will be used for model training. The ACSM operates in "Test and Learn" mode, during which the model executes "naïve decisioning" within the eligibility boundaries defined by rules specifying suitable user profile, account, device and device configurations and parameters for specific messages, such as by using a naïve decision for a user that is a uniformly random selection of the messages from the messages that a user is eligible to receive, based on the eligibility rules. During the model training phase, after sufficient data is gathered from the test and learn phase, model training is initiated, during which naïve decisioning continues to operate and additional test-and-learn data continues to be gathered and is incorporated into the final optimized model immediately before the next phase. During the optimized model launch phase, after the model is trained and its expected performance is assessed, it is deployed. During this phase the model executes "optimized" decisioning", meaning that for each user, the model selects the message that it deems most appropriate to achieve the profile, account, device settings changes outcomes desired, collectively referred to at times herein as performance metrics. Also during this phase, the model receives feedback from the messaging activity and updates its parameters, which in one embodiment are the outcome probability distributions at the decision tree leaf nodes in the model, leveraging reinforcement learning. A small portion of the user base continues to be targeted in a naïve way, which provides an ongoing baseline against which the performance of the optimized model is measured. It is important to note that many treatments/messages may lead to a common leaf of the decision tree, based on the fact that they have common metadata, which enables the capability to accommodate novel messages with similar metadata to those in the training dataset that may be subsequently added to the set of treatments, and which is atypical of other multi-armed bandit-based systems.

In at least some embodiments, the ACSM system employs an optimization model that includes one or more of the following: an ensemble random forest learner, which segments the users/devices and messaging/configuration content into micro-segments, based on attributes of the users, user devices and of the messaging; tree-based models that each contains a series of splits based on the user/device attributes and message/configuration attributes used as decision model features, with the specific splitting attribute chosen in at least one embodiment by first randomly sampling a subset of the totality of the available attributes, and then iteratively traversing each of the sampled attributes and their values to find the combination of (attribute, attribute-value) that maximizes the uniformity of user responses in the leaf node, with the very end of each tree branch being a leaf node that captures the microsegment of features of (user, messaging experience/configuration) attributes as defined by the splits above it, with tree branches optionally having dozens of splits before terminating at a leaf node, and with each leaf node containing a probability distribution of an impact that a combination of user microsegment and message/experience is expected to prompt users to perform actions against a performance metric (KPI), such as but not limited to, particular configuration setting changes(s) on the device; and a decisioning step that determines which message/configuration to send to each user/device, based on multi-armed bandits and Thompson Sampling (reinforcement learning step). After deployment, in at least one embodiment, the ACSM system's optimization model incorporates feedback from ongoing optimized messaging/configuration activity and adjusts the distributions in the leaf nodes of the random forest, thereby continuously updating the probability distributions that determine the decisioning policy through Thompson sampling—through this dynamic update mechanism, the ACSM system is able to automatically increase the volume of (user/device, messaging experience/configuration) combinations that are improving the KPI and decreases volume of those that are not.

While a limited number of attributes and nodes are shown with respect to FIGS. 2A-2F, it will be appreciated that decision structures in other embodiments and situations may have much larger numbers of nodes and may use other types of attributes, as well as to store and represent associated training data information and other information (e.g., tests) in other manners. Furthermore, while various details are provided in the examples of FIGS. 2A-2F, the described techniques are not limited to these example details.

Figure 3A:
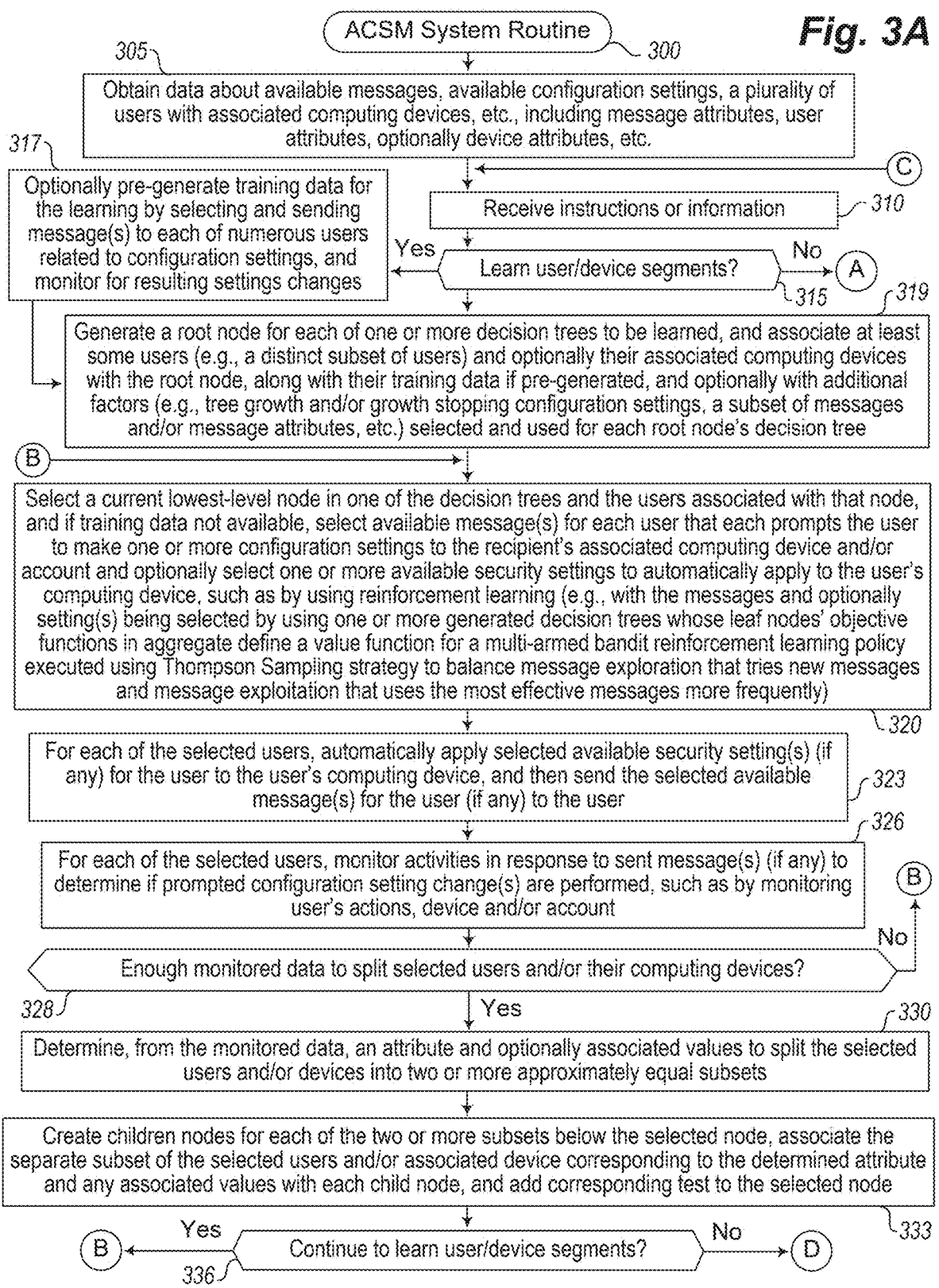

FIGS. 3A-3B illustrate a flow diagram of an example embodiment of an Automated Configuration Settings Manager (ACSM) System routine 300. The routine may be performed by, for example, execution of the ACSM System 140 and/or ACSM System 140b of FIG. 1A, the ACSM Systems 140-1 and/or 140-2 of FIGS. 1B-1C and/or an ACSM system used to perform the techniques described with respect to FIGS. 2A-2F or as is elsewhere discussed in the document. While the illustrated embodiment of the routine corresponds to generating a single decision tree at a time, it will be appreciated that in other situations and embodiments the routine may operate in other manners, including to generate one or more decision trees or other decision structures simultaneously using already available training data, etc.

In the illustrated embodiment, the routine begins at block 305, where information is attained about available messages, available configuration settings, a plurality of users with associated computing devices, etc., with the obtained information corresponding to a variety of types of attributes including user attributes, device attributes, message attributes, etc. In the illustrated embodiment, the routine continues to block 310, to wait until instructions or other information is received. In block 315, the routine then determines whether the received instructions or other information correspond to learning one or more segments of users and/or computing devices, such as part of generating one or more decision trees or other decision structures. If so, the routine continues to perform blocks 317-338 to generate the decision structure(s) and learn the corresponding user and/or computing device segments. In particular, in block 317 the routine optionally generates training data to be used in forming one or more decision trees, including selecting a plurality of messages to send to a plurality of users with respect to one or more configuration settings (e.g., one or more configuration settings that are selected and automatically applied to one or more computing devices and/or accounts of each of the users), and monitors activities in response to the sent messages to determine if prompted configuration setting changes are performed, such as by monitoring recipient users' actions, computing devices, and/or accounts. Alternatively, if the training data is not generated in advance, the routine may instead generate the training data incrementally as the one or more decision structures are being generated, as discussed with respect to blocks 320-326.

After block 317, the routine continues to block 319 to generate a root node for each of one or more decision trees to be learned (e.g., multiple decision trees that are part of a common bag or forest), and for each root node, associates corresponding data with the root node to be used for generation of the decision tree from that root node (e.g., a subset of the overall available users, such as to use different user subsets with different decision trees; tree growth and/or growth stopping configuration settings, such as to use different such configuration settings with different decision trees; a subset of messages and/or message attributes, such as to use different such messages and/or message attributes with different decision trees; one or more message sending strategies, such as to use different such message sending strategies with different decision trees; etc.), such as to use variations in the corresponding data used for each of multiple decision trees—if training data is already generated in block 317, the training data associated with each root node further includes information about the messages sent to each associated user for the root node, and optionally additional data about corresponding results and/or about each such user's associated computing device and/or account. It will be appreciated that each such user may in some embodiments and situations have multiple associated computing devices and/or multiple associated accounts, and if so data for some or all such associated computing devices and/or accounts may be combined and used together with such a user. In block 320, the routine then selects a current lowest-level node in one of the decision trees (starting with one of the root nodes if no other nodes have yet been created) and selects the users associated with that current node. If the training data has not already been generated in block 317, the routine then proceeds to select, for each of those users, one or more available messages to send to the user that each prompts the recipient to make one or more configuration settings to the recipient's associated computing device(s) and/or associated account(s), and optionally further selects one or more available security settings to automatically apply to the recipient's associated computing device(s) and/or account(s)—the selection of the one or more messages and optionally one or more settings for each of the users may in at least some embodiments be performed using reinforcement learning, such as with the messages and optionally setting(s) being selected by using one or more generated decision trees whose leaf nodes' objective functions in aggregate define a value function for a multi-armed bandit reinforcement learning policy executed using Thompson Sampling to balance message exploration and message exploitation. In block 323, any selected security settings for each of the users are then automatically applied to that user's associated computing device(s) and/or account(s), and any selected messages for each of the users are then sent to that user. In block 326, if the training data was not already generated with respect to block 317, the routine monitors activities in response to sent message(s) in block 323 for each of the users, such as by monitoring each user's actions, computing device(s) and/or account(s).

The routine then proceeds to block 328 to determine if there is enough data available to split the selected users and/or their computing devices or the current node into multiple subsets (e.g., approximately equal subsets), and if not returns to block 320 to continue to gather additional training data. Otherwise, the routine continues to block 330 to determine, from the monitored data from blocks 317 and/or 326, an attribute and optionally associated values to split the selected users and/or their associated computing devices into two or more subsets, and in block 333 create children nodes for each of the subsets below the current node, associates the corresponding subset of users and/or their associated computing devices for each of the children nodes with that child node along with any associated training data, and adds a corresponding test to the current node related to the attribute and optionally associated values used for the split. The routine then continues to block 336, where it determines whether to continue to learn additional user and/or computing device segments, such as if the number of users associated with one or more existing lowest-level nodes have a quantity of associated users above a defined threshold and no other stopping criteria have been reached, and if so returns to block 320 to gather additional training data. If it is instead determined in block 336 that the learning of the user and/or computing device segments is completed, the routine continues to block 338 to analyze the training data to determine the most effective messages use for different combinations of user and/or device attributes, such as for selected learned user and/or computing device segments having common shared attributes of those types.

After block 338, or if it is instead determined in block 315 that the instructions or other information received in block 310 do not indicate to learn one or more user and/or computing device segments, the routine continues to block 340, where it determines if the instructions or other information received in block 310 indicate to use one or more learned user and/or computing device segments, such as one or more segments just generated in blocks 317-338 or instead one or more segments generated at an earlier time and retrieved from storage. If so, the routine continues to perform blocks 343-348 to use the learned one or more user and/or computing device segments, such as to use effective messages and/or configuration settings associated with the learned one or more user and/or computing device segments with other users and/or computing devices. In particular, in block 343 the routine obtains data about additional users having additional associated computing devices, such as for users different from those in the training data or instead for some of the users in the training data who are in different segments from the one or more learned segments to currently use, and such as to obtain data about attributes of those additional users and/or of associated computing devices and/or accounts of the additional users. In block 346, the routine then, for each of the additional users, identifies one or more of the combinations of learned user and/or computing device attributes from block 338 that matches attributes of the additional user and optionally their associated computing device(s), selects one or more of the most effective messages sent to or otherwise associated with the identified combination(s) and sends the selected one or more most effective messages to the additional user, and optionally selects one or more of the most effective configuration settings used with the identified combination(s) and applies the selected one or more most effective configuration settings to the additional user's computing device(s). In block 348, the routine then, for each of the additional users, optionally monitors activities in response to the one or more sent messages to determine if any configuration setting changes prompted in the sent message(s) are performed, such as by monitoring that user and/or the associated computing device(s) and/or account(s) of that additional user.

After block 348, or if it is instead determined in block 340 that the instructions or other information received in block 310 are not to use previously learned user and/or computing device segments, the routine continues to block 350 to determine if the instructions or other information received in block 310 indicate to generate one or more new messages based at least in part on previous processing, such as based on one or more previously identified messages that are effective with respect to one or more learned user and/or computing device segments. If so, the routine continues to block 353, where it retrieves information about the most effective messages for one or more combinations of user and/or device attributes, and selects one or more of the effective messages. In block 356, the routine then determines one or more message attributes to modify in the one or more selected messages, such as one or more of an included visual graphic, a topic and/or tone of included text, a type of prompted action and/or settings change, a type of intended user recipient, or other type of visual characteristic of the message. In block 358, the routine then generates an LLM prompt related to performing the generation of new candidate messages by modifying the determined message attribute(s) in one or more messages that are supplied to the LLM, and supplies one or more of the selected messages and the generated LLM prompt to each of one or more trained LLMs, optionally with additional details about one or more of the determined message attributes (e.g., examples of new information to use and/or emulate)—in at least some embodiments, the prompt is created using a templating system with modifiable parameters that allow for changing message elements or other message attributes such as, but not limited to, tone, call to action, brand guidelines to be switched around to meet the user needs, etc. In block 360, the routine then receives one or more new candidate messages from the trained LLM(s), selects zero or more of the new candidate messages to further use by adding them to the available messages for evaluation when sent to users (e.g., using feedback about which of the zero or more new candidate messages to select, such as manual feedback from one or more operator users) and optionally determines one or more of the previously existing available messages to remove (although in some embodiments does not perform such existing message removal) according to one or more removal criteria (e.g., low effectiveness, age, etc.), and updates the available messages to reflect the determined changes.

If it is instead determined in block 350 that the instructions or other information received in block 310 are not to generate new messages at the current time, the routine continues to block 390 to optionally perform one or more other indicated actions as appropriate. Such other actions may have various forms in various embodiments, such as to receive and store data for later use of one or more types (e.g., about users, computing devices, accounts, available messages, available configuration settings, etc.), to receive and respond to requests for previously generated information, to specify thresholds and other configuration data to use in performing of automated operations by the ACSM system, etc.

After blocks 360 or 390, the routine continues to block 395 to determine whether to continue, such as until an explicit indication to terminate is received, or alternatively to proceed only if an explicit indication to do so is received—if it is determined to continue, the routine returns to block 310 to wait for and receive one or more other instructions or other information, and otherwise continues to block 399 and ends.

Those skilled in the art will appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method comprising:
   obtaining, by one or more computing systems, information about a plurality of computing devices and a plurality of available device security settings and a plurality of defined security phishing messages with content related to at least some of the device security settings, wherein the plurality of computing devices have a plurality of respective users and each has an associated plurality of device attributes;
   selecting, by the one or more computing systems and for each of multiple first computing devices that are a subset of the plurality of computing devices, one or more first device security settings of the plurality of device security settings, and one or more first security phishing messages of the plurality of defined security phishing messages that prompt one or more first actions on that first computing device related to the one or more first device security settings, the prompted one or more first actions being inconsistent with a defined security policy for the plurality of computing devices and the plurality of respective users;
   initiating, by the one or more computing systems and for each of the multiple first computing devices, applying, to that first computing device, the one or more first device security settings selected for that first computing device, and sending, to the respective user of that first computing device, the one or more first security phishing messages selected for that first computing device;
   monitoring, by the one or more computing systems and after the initiating of the applying and the sending, subsequent activities performed on each of the multiple first computing devices to determine if the subsequent activities include the prompted one or more first actions on that first computing device;
   segmenting, by the one or more computing systems and based at least in part on the subsequent activities, the multiple first computing devices into multiple learned groups each having a distinct subset of the multiple first computing devices that share one or more device attributes and share at least one applied first device security setting and share at least one sent first security phishing message and share at least one type of performed subsequent activity;
   determining, by the one or more computing systems and for a first learned group of the multiple learned groups, each of one or more further computing devices of the plurality of computing devices that are separate from the multiple first computing devices and that have a plurality of defined attributes including the shared one or more device attributes of the first computing devices of the first learned group;
   initiating, by the one or more computing systems and for each of the one or more further computing devices, applying, to that further computing device, the shared at least one applied first device security setting for the first learned group, and sending, to the respective user of that further computing device, one or more of the shared at least one sent first security phishing messages for the first learned group;

selecting, by the one or more computing systems, a second learned group of the multiple learned groups whose shared at least one type of performed subsequent activity does not include any prompted first actions for the first computing devices of the second learned group based at least in part on the shared at least one applied first device security setting for the second learned group preventing performance of such prompted first actions for the first computing devices of the second learned group;

generating, by the one or more computing systems and using at least one trained large language model (LLM), multiple new second security phishing messages that are based in part on the shared at least one sent first security phishing message for the second learned group and that include alternative prompts to perform second actions;

initiating, by the one or more computing systems and for each of multiple second computing devices that are a subset of the plurality of computing devices, applying, to that second computing device, the shared at least one applied first device security setting for the second learned group, and sending, to the respective user of that second computing device, at least one of the multiple new second security phishing messages;

determining, by the one or more computing systems and based at least in part on monitoring further subsequent activities performed on each of the multiple second computing devices to determine that the further subsequent activities do not include the prompted one or more second actions on that second computing device, to further apply the shared at least one applied first device security setting for the second learned group to additional computing devices; and initiating, by the one or more computing systems and based on the determining, applying, to each of the additional computing devices, the shared at least one applied first device security setting for the second learned group.

2. The computer-implemented method of claim 1 further comprising:

monitoring, by the one or more computing systems and after sending the one or more of the shared at least one sent first security phishing messages for the first learned group to respective users of the one or more further computing devices, additional subsequent activities performed on each of the one or more further computing devices to determine if the additional subsequent activities include one or more prompted further actions on that further computing device; and updating, based at least in part on determining if the additional subsequent activities include one or more prompted further actions on the one or more further computing devices, the segmenting to include one or more additional learned groups each having a further distinct subset of the multiple first computing devices and the one or more further computing devices, and wherein the segmenting and the updating includes using reinforcement learning, wherein the selecting of the one or more first device security settings and the one or more first security phishing messages for each of the multiple first computing devices is performed using a multi-armed bandit selection policy with Thompson sampling, wherein the multiple learned groups and the one or more additional learned groups are leaf nodes of multiple learned hierarchical decision trees that have intermediate nodes each corresponding to a division of users using a test related to at least one of a shared device attribute or a shared applied device security setting or a shared sent security message phishing or a shared type of performed subsequent activity, and wherein the multiple learned hierarchical decision trees have variations in at least tests used for the intermediate nodes of the multiple learned hierarchical decision trees.

3. A computer-implemented method comprising:

obtaining, by one or more computing systems, information about a plurality of computing devices and a plurality of available device security settings and a plurality of defined security messages with content related to at least some of the device security settings, wherein the plurality of computing devices have a plurality of respective users and each has an associated plurality of device attributes;

selecting, by the one or more computing systems and for each of multiple first computing devices that are a subset of the plurality of computing devices, one or more first device security settings of the plurality of device security settings, and one or more first security messages of the plurality of defined security messages that prompt one or more first actions on that first computing device related to the one or more first device security settings;

initiating, by the one or more computing systems and for each of the multiple first computing devices, applying, to that first computing device, the one or more first device security settings selected for that first computing device, and sending, to the respective user of that first computing device, the one or more first security messages selected for that first computing device;

monitoring, by the one or more computing systems and after the initiating of the applying and the sending, subsequent activities performed on each of the multiple first computing devices to determine if the subsequent activities include the prompted one or more first actions on that first computing device;

segmenting, by the one or more computing systems and based at least in part on the subsequent activities, the multiple first computing devices and respective users of the multiple first computing devices into multiple learned groups each having a distinct subset of the multiple first computing devices that share one or more device attributes and share at least one applied first device security setting and share at least one sent first security message and share at least one type of performed subsequent activity and share at least one user attribute of the respective users of the multiple first computing devices;

selecting, by the one or more computing systems, one of the learned groups whose shared at least one type of performed subsequent activity does not include any prompted first actions for the first computing devices of the one learned group based at least in part on the shared at least one applied first device security setting for the one learned group preventing performance of such prompted first actions for the first computing devices of the one learned group and in part on one or more of the respective users of the multiple first computing devices not attempting the performance of such prompted first actions for the first computing devices of the one learned group;

generating, by the one or more computing systems and using at least one trained large language model (LLM), multiple new second security messages that are based in part on the shared at least one sent first security message for the one learned group and that include alternative prompts to perform second actions;
initiating, by the one or more computing systems and for each of multiple second computing devices that are a subset of the plurality of computing devices, applying, to that second computing device, the shared at least one applied first device security setting for the one learned group, and sending, to the respective user of that second computing device, at least one of the multiple new second security messages;
determining, by the one or more computing systems and based at least in part on monitoring further subsequent activities performed on each of the multiple second computing devices to determine that the further subsequent activities do not include the prompted one or more second actions on that second computing device, to further apply the shared at least one applied first device security setting for the one learned group to additional computing devices; and
initiating, by the one or more computing systems and based on the determining, applying, to each of the additional computing devices, the shared at least one applied first device security setting for the one learned group.

4. The computer-implemented method of claim 3 further comprising:
determining, by the one or more computing systems and for a first learned group of the multiple learned groups, each of one or more further computing devices of the plurality of computing devices that are separate from the multiple first computing devices and that have a plurality of defined attributes including the shared one or more device attributes of the first computing devices of the first learned group; and
initiating, by the one or more computing systems and for each of the one or more further computing devices, applying, to that further computing device, the shared at least one applied first device security setting for the first learned group, and sending, to the respective user of that further computing device, one or more of the shared at least one sent first security messages for the first learned group.

5. The computer-implemented method of claim 4 further comprising:
monitoring, by the one or more computing systems and after sending the one or more of the shared at least one sent first security messages for the first learned group to respective users of the one or more further computing devices, additional subsequent activities performed on each of the one or more further computing devices to determine if the additional subsequent activities include one or more prompted further actions on that further computing device; and
updating, by the one or more computing systems and based at least in part on determining if the additional subsequent activities include one or more prompted further actions on the one or more further computing devices, the segmenting to include one or more additional learned groups each having a further distinct subset of the multiple first computing devices and the one or more further computing devices,
and wherein the segmenting and the updating includes using reinforcement learning, wherein the selecting of the one or more first device security settings and the one or more first security messages for each of the multiple first computing devices is performed using a multi-armed bandit selection policy with Thompson sampling, wherein the multiple learned groups and the one or more additional learned groups are leaf nodes of multiple learned hierarchical decision trees that have intermediate nodes each corresponding to a division of computing devices using a test related to at least one of a shared device attribute or a shared applied device security setting or a shared sent security message or a shared type of performed subsequent activity or a shared user attribute, and wherein the multiple learned hierarchical decision trees have variations in at least tests used for the intermediate nodes of the multiple learned hierarchical decision trees.

6. A non-transitory computer-readable medium having stored contents that cause one or more computing systems to perform automated operations including at least:
obtaining, by the one or more computing systems, information about a plurality of computing devices having a respective plurality of users, and about a group of multiple defined messages, wherein the plurality of computing devices each has an associated plurality of device attributes, wherein the plurality of users each has an associated plurality of user attributes and an associated account, and wherein the multiple defined messages have contents related to changing settings of accounts of the plurality of users;
selecting, by the one or more computing systems and for each of multiple first users that are a subset of the plurality of users, one or more first messages of the multiple defined messages that prompt one or more first actions on one or more first computing devices of that first user to cause one or more first account settings changes on the account of that first user, and sending to that first user the one or more first messages selected for that first user;
monitoring, by the one or more computing systems and after the sending, subsequent activities performed by each of the multiple first users on the one or more first computing devices of that first user to determine if the subsequent activities include the prompted one or more first actions to cause the one or more first account settings changes on the account of that first user;
segmenting, by the one or more computing systems and based at least in part on the subsequent activities, the multiple first users into multiple learned groups each having a distinct subset of the multiple first users that share one or more user attributes and share at least one caused account setting change and share at least one sent first message;
selecting, by the one or more computing systems, one of the learned groups based at least in part on the shared at least one caused account setting change for that one learned group;
generating, by the one or more computing systems and using at least one trained large language model (LLM), multiple new second messages to include in the group of multiple defined messages that are based in part on the shared at least one sent first message for the one learned group and that include changed contents related to changing user account settings;
sending, by the one or more computing systems and for each of multiple second users that are a subset of the plurality of users, at least one of the multiple new second messages to that second user that prompts one or more second actions on one or more second computing devices of that second user to cause one or more second account settings changes on the account of that second user;

determining, by the one or more computing systems and based at least in part on monitoring further subsequent activities performed by each of the multiple second users on the one or more second computing devices of that second user, if the further subsequent activities include the prompted one or more second actions to cause the one or more second account settings changes on the account of that second user; and initiating, by the one or more computing systems and based on the determining, updates to the group of multiple defined messages that will be sent to additional users to improve account settings changes on the accounts of the additional users, the updates including removing one or more messages from the group.

7. The non-transitory computer-readable medium of claim 6 wherein the settings of the accounts of the plurality of users are security settings, wherein the multiple defined messages are security messages, wherein the segmenting of the multiple first users into multiple learned groups further includes segmenting the one or more first computing devices of each of the multiple first users into the multiple learned groups, wherein first computing devices in each of the multiple learned groups further share one or more device attributes and share at least one applied security setting, and wherein the method further comprises initiating, by the one or more computing systems and based on the determining, applying, to each of additional computing devices, the shared at least one applied security setting for the one learned group.

8. The non-transitory computer-readable medium of claim 6 wherein the stored contents include software instructions that, when executed by the one or more computing systems, cause the one or more computing systems to perform further automated operations including:

determining, by the one or more computing systems and for a first learned group of the multiple learned groups, each of one or more further users of the plurality of users that have a plurality of user attributes including one or more user attributes shared by first users of the first learned group; and initiating, by the one or more computing systems and for each of the one or more further users, sending, to that further user, one or more of the shared at least one sent first message for the first learned group.

9. The non-transitory computer-readable medium of claim 8 wherein the automated operations further include:

monitoring, by the one or more computing systems and after sending the one or more of the shared at least one sent first messages for the first learned group to the one or more further users, additional subsequent activities performed by each of the one or more further users to determine if the additional subsequent activities include one or more prompted further actions; and updating, by the one or more computing systems and based at least in part on determining if the additional subsequent activities include one or more prompted further actions by the one or more further users, the segmenting to include one or more additional learned groups each having a further distinct subset of the multiple first users, and wherein the segmenting and the updating includes using reinforcement learning, wherein the selecting of the one or more first messages for each of the multiple first users is performed using a multi-armed bandit selection policy with Thompson sampling, wherein the multiple learned groups and the one or more additional learned groups are leaf nodes of multiple learned hierarchical decision trees that have intermediate nodes each corresponding to a division of users using a test related to at least one of a shared user attribute or a shared caused account setting change or a shared sent first message, and wherein the multiple learned hierarchical decision trees have variations in at least tests used for the intermediate nodes of the multiple learned hierarchical decision trees.

10. A system comprising:

one or more hardware processors of one or more computing systems; and one or more memories with stored instructions that, when executed, cause the system to perform automated operations including at least:

obtaining information about a plurality of users having a respective plurality of computing devices, and about a group of multiple defined messages, wherein the plurality of users each has an associated plurality of user attributes and an associated account, and wherein the multiple defined messages have contents related to changing settings of accounts of the plurality of users;

selecting, for each of multiple first users that are a subset of the plurality of users, one or more first messages of the multiple defined messages that prompt one or more first actions of that first user to cause one or more first account settings changes on the account of that first user, and sending to that first user the one or more first messages selected for that first user;

determining, after the sending and for each of the multiple first users, if the one or more first account settings changes occur on the account of that first user;

segmenting, based at least in part on the determining, the multiple first users into multiple learned groups each having a distinct subset of the multiple first users that share one or more user attributes and share at least one caused account setting change and share at least one sent first message;

selecting one of the learned groups based at least in part on the shared at least one caused account setting change for that one learned group;

generating, using at least one trained large language model (LLM), one or more new second messages to include in the group of multiple defined messages that are based in part on the shared at least one sent first message for the one learned group and that include changed contents related to changing user account settings;

sending, for each of multiple second users that are a subset of the plurality of users, at least one of the new second messages to that second user that prompts one or more second actions of that second user to cause one or more second account settings changes on the account of that second user;

determining, for each of the multiple second users, if the one or more second account settings changes occur on the account of that second user; and initiating, based on the determining if the one or more second account settings changes occur on the account of that second user, updates to the group of multiple defined messages to cause account settings changes on accounts of additional users that receive messages from the updated group.

11. The system of claim 10 wherein the settings of the accounts of the plurality of users are security settings, wherein the multiple defined messages are security messages, wherein the segmenting of the multiple first users into multiple learned groups further includes segmenting one or more first computing devices of each of the multiple first users into the multiple learned groups, wherein first computing devices in each of the multiple learned groups further share one or more device attributes and share at least one applied security setting, wherein the updates to the group of multiple defined messages includes removing one or more messages from the group, and wherein the automated operations further include initiating, based on the determining if the one or more second account settings changes occur on the account of that second user, applying, to each of additional computing devices, the shared at least one applied security setting for the one learned group.

12. The system of claim 10 wherein the automated operations further include, after the segmenting and before the generating of the multiple new second messages:
sending, to each of multiple third users that are a subset of the plurality of users and separate from the first users, at least one message selected from a message group that includes the one or more first messages and one or more additional messages of the multiple defined messages, wherein the additional messages prompt one or more third actions of that third user to cause one or more third account settings changes on the account of that third user;
determining, for each of the multiple third users, if the one or more third account settings changes occur on the account of that third user; and
updating, based at least in part on determining if the one or more third account settings changes occur on accounts of the multiple third users, the segmenting to include one or more additional learned groups each having a further distinct subset of the multiple first and third users.

13. The system of claim 12 wherein the segmenting of the multiple first users includes using reinforcement learning, and wherein the multiple learned groups and the one or more learned groups are leaf nodes of one or more learned hierarchical decision trees that have intermediate nodes each corresponding to a division of users using a test related to at least one of a shared user attribute or a shared caused account setting change or a shared sent message.

14. The system of claim 13 wherein the one or more learned hierarchical decision trees include a plurality of learned hierarchical decision trees having variations in at least one of tests used for the intermediate nodes of that learned hierarchical decision tree, or subsets of training data used for generating the plurality of learned hierarchical decision trees, or configuration settings used to control growth of the plurality of learned hierarchical decision trees, or configuration settings used to control stopping of the growth of the plurality of learned hierarchical decision trees.

15. The system of claim 13 wherein the one or more learned hierarchical decision trees include a plurality of learned hierarchical decision trees having variations in attributes of at least one of users or messages or devices that are used for splitting nodes of the learned hierarchical decision trees into children nodes.

16. The system of claim 13 wherein the selecting of the one or more first messages for each of the multiple first users and selecting of the at least one message for each of the multiple third users is performed using a multi-armed bandit selection policy with Thompson sampling to increase exploitation of previously sent messages that are identified based on account setting changes associated with those previously sent messages, the exploitation including selecting those previously sent messages to send to other users at a frequency higher than random while continuing to perform exploration by selecting other messages different than those previously sent messages to send to additional users.

17. The system of claim 10 wherein the segmenting of the multiple first users into the multiple learned groups includes associating, with each of the multiple learned groups and based at least in part on the determining if the one or more first account settings changes occur on the account of each of the multiple first users, one or more likelihoods of the one or more first account settings changes occurring on accounts of additional users who match that learned group and who receive one or more messages of the multiple defined messages that share message attributes with the shared at least one sent first message for that learned group, and wherein the automated operations further include, after the segmenting and before the generating of the multiple new second messages:
sending, to each of multiple third users that are a subset of the plurality of users and separate from the first users, at least one message selected from a message group that includes the one or more first messages and one or more additional messages of the multiple defined messages, wherein the additional messages prompt one or more further first actions of that third user to cause one or more further first account settings changes on the account of that third user;
determining, for each of the multiple third users, if the one or more further first account settings changes occur on the account of that third user; and
updating, based at least in part on determining if the one or more further first account settings changes occur on accounts of the multiple third users, the associated one or more likelihoods for at least one of the multiple learned groups.

18. The system of claim 10 wherein the segmenting of the multiple first users into the multiple learned groups further includes segmenting some of the multiple first users into one or more additional learned groups each having a distinct subset of the multiple first users that share one or more user attributes and share at least one sent first message and share having no caused account setting changes.

19. The system of claim 10 wherein the automated operations further include segmenting the multiple second users into one or more additional learned groups each having a distinct subset of the multiple second users that share one or more user attributes and share at least one sent first message and share a status of whether any caused account setting changes occur on accounts of the second users of that subset.

20. The system of claim 10 wherein the generating of the one or more new second messages further includes supplying, to the LLM, the shared at least one sent first message for the one learned group with instructions to modify one or more message attributes in the one or more new second messages.

21. The system of claim 20 wherein the multiple defined messages each has a plurality of message attributes, wherein the instructions to modify the one or more message attributes in the one or more new second messages include instructions to modify the one or more new second messages to include the one or more message attributes, and wherein the automated operations further include determining the one or more message attributes to modify, including:
- determining, for each of the multiple defined messages, a measure of success for copies of that defined message that are sent to at least some of the plurality of users in causing changes to settings of accounts of the at least some users;
- selecting some of the multiple defined messages whose determined measure of success is above a defined threshold;
- analyzing the selected some defined messages to identify one or more message attributes common to the selected some defined messages; and
- selecting the identified one or more message attributes as the determined one or more message attributes.

22. The system of claim 20 wherein the one or more message attributes to modify in the one or more new second messages include at least one of a visual graphic included in the one or more new second messages, or of a topic of text included in the one or more new second messages, or of a tone of the text included in the one or more new second messages, or of a visual characteristic of the one or more new second messages, or of a type of second action prompted by the one or more new second messages, or of a type of second account settings change prompted by the one or more new second messages, or of a type of user for which the one or more new second messages are intended.

23. The system of claim 20 wherein the automated operations further include generating the instructions to supply to the LLM using one or more prompt engineering techniques.

24. The system of claim 10 wherein the generating of the one or more new second messages includes generating multiple new second messages, and wherein at least one of the multiple new second messages is based on, for an additional learned group having a subset of the multiple first users that share one or more user attributes and share at least one sent first message and share having no caused account setting changes, the shared at least one sent first message for the additional learned group.

25. The system of claim 10 wherein the generating of the one or more new second messages includes generating multiple candidate second messages, and receiving feedback to select the one or more new second messages from the multiple candidate second messages.

26. The system of claim 10 wherein the multiple second users include one or more of the multiple first users and one or more additional users of the plurality of users who are not part of the multiple first users.

27. The system of claim 10 wherein the selecting of the one or more first messages for each of the multiple first users further includes, for each of the multiple first users, selecting a sequence of two or more first messages for that first user using reinforcement learning techniques, and sending the two or more first messages to that first user in the selected sequence with one or more defined criteria to use in determining when to send a next message of the two or more first messages after a prior message of the two or more first messages was sent.

* * * * *